US011239570B2

(12) United States Patent
Fried et al.

(10) Patent No.: US 11,239,570 B2
(45) Date of Patent: Feb. 1, 2022

(54) WIRELESS COMMUNICATIONS SYSTEM WITH SCALABLE ARCHITECTURE

(71) Applicant: HOOK'D WIFI INC., Lubbock, TX (US)

(72) Inventors: Jeremy B. Fried, Las Vegas, NV (US); Jimmy Wynoka Sheffield, Jr., Georgetown, TX (US); Amber E. Wayne, Las Vegas, NV (US); Frank Carlo Pallone, Plano, TX (US)

(73) Assignee: HOOK'D WIFI INC., Lubbock, TX (US)

( * ) Notice: Subject to any disclaimer, the term of this patent is extended or adjusted under 35 U.S.C. 154(b) by 76 days.

(21) Appl. No.: 16/415,905

(22) Filed: May 17, 2019

(65) Prior Publication Data
US 2020/0119459 A1 Apr. 16, 2020

Related U.S. Application Data

(63) Continuation-in-part of application No. 16/161,304, filed on Oct. 16, 2018, now abandoned, which is a
(Continued)

(51) Int. Cl.
*H01Q 21/20* (2006.01)
*H01Q 1/24* (2006.01)
(Continued)

(52) U.S. Cl.
CPC .......... *H01Q 21/205* (2013.01); *H01Q 1/246* (2013.01); *H01Q 1/42* (2013.01); *H01Q 19/106* (2013.01); *H01Q 21/065* (2013.01); *H04W 88/08* (2013.01)

(58) Field of Classification Search
CPC ........ H01Q 21/205; H01Q 1/246; H01Q 1/42; H01Q 21/065; H01Q 19/106;
(Continued)

(56) References Cited

U.S. PATENT DOCUMENTS 7,190,972 B1 * 3/2007 Hollister ........... H04L 29/06027
455/411
7,319,684 B2 1/2008 Tamaki et al.
(Continued)

FOREIGN PATENT DOCUMENTS

| EP | 0459279 A1 | 12/1991 |
| WO | 03045034 A1 | 5/2003 |
| WO | 2018022526 A1 | 2/2018 |

OTHER PUBLICATIONS

International Searching Authority, Search Report and Written Opinion for International Application No. PCT/US19/56354, dated Jan. 6, 2020; 8 pages.
(Continued)

*Primary Examiner* — Ivan O Latorre
(74) *Attorney, Agent, or Firm* — Dickinson Wright PLLC

(57) ABSTRACT

A configurable wireless communications module may include a first antenna layer having one or more antenna operating at a first wireless radio band; a second antenna layer having one or more antenna operating at a second wireless radio band; and a support structure for supporting the first antenna layer and the second antenna layer in a stacked configuration. A scalable modular processor within the communication may be customized based on the particular use scenario and configured to provide a number of functions in the RF domain and in concert with a variety of sensors and components.

18 Claims, 23 Drawing Sheets

Related U.S. Application Data continuation of application No. 16/161,223, filed on Oct. 16, 2018, now abandoned.

(51) Int. Cl.
 *H01Q 1/42* (2006.01)
 *H01Q 21/06* (2006.01)
 *H04W 88/08* (2009.01)
 *H01Q 19/10* (2006.01)

(58) Field of Classification Search
 CPC ...... H01Q 1/1228; H01Q 1/523; H01Q 1/526; H01Q 21/28; H01Q 1/2291; H04W 88/08
 See application file for complete search history.

(56) References Cited

U.S. PATENT DOCUMENTS

| | | | |
|---|---|---|---|
| 7,389,534 B1 | 6/2008 | He | |
| 7,961,618 B1* | 6/2011 | Prasad | H04L 41/0896 370/235 |
| 8,604,987 B1* | 12/2013 | Doane | H01Q 9/40 343/725 |
| 9,374,779 B2* | 6/2016 | Yi | H04W 72/121 |
| 9,785,879 B1 | 10/2017 | Lauria et al. | |
| 10,276,933 B1 | 4/2019 | Chukka et al. | |
| 10,763,575 B2 | 9/2020 | Constance et al. | |
| 2002/0186710 A1* | 12/2002 | Alvesalo | H04W 16/14 370/468 |
| 2004/0057410 A1 | 3/2004 | Kaipiainen et al. | |
| 2005/0057427 A1 | 3/2005 | Wensink | |
| 2006/0280262 A1 | 12/2006 | Malladi | |
| 2007/0030857 A1* | 2/2007 | Fulknier | H04L 45/00 370/401 |
| 2007/0110017 A1 | 5/2007 | Fulknier et al. | |
| 2007/0155325 A1* | 7/2007 | Bambic | H04W 88/00 455/41.2 |
| 2007/0265011 A1* | 11/2007 | Han | H04B 17/327 455/437 |
| 2009/0247180 A1* | 10/2009 | Higuchi | H04L 1/20 455/452.2 |
| 2011/0078355 A1 | 3/2011 | Tan et al. | |
| 2013/0016682 A1* | 1/2013 | Russell | G01S 5/0252 370/329 |
| 2013/0039271 A1 | 2/2013 | de la Garrigue | |
| 2013/0070622 A1 | 3/2013 | Degioanni et al. | |
| 2014/0018089 A1* | 1/2014 | Wu | H04W 72/0473 455/452.1 |
| 2014/0118210 A1 | 5/2014 | Cooper et al. | |
| 2014/0364714 A1 | 12/2014 | Ameri et al. | |
| 2015/0171658 A1 | 6/2015 | Manova-Elssibony et al. | |
| 2015/0200838 A1 | 7/2015 | Nadeau et al. | |
| 2015/0365837 A1 | 12/2015 | Valasma et al. | |
| 2016/0014633 A1* | 1/2016 | Bertagna | H01Q 3/242 370/338 |
| 2016/0104932 A1 | 4/2016 | Aminzadeh et al. | |
| 2016/0181854 A1 | 6/2016 | Leabman | |
| 2016/0192037 A1 | 6/2016 | Hernandez et al. | |
| 2016/0232783 A1 | 8/2016 | Davis et al. | |
| 2016/0262027 A1 | 9/2016 | Lo et al. | |
| 2017/0033469 A1 | 2/2017 | Hoffman et al. | |
| 2017/0048035 A1* | 2/2017 | Verbin | H04L 5/1469 |
| 2017/0075325 A1 | 3/2017 | Aggarwal et al. | |
| 2017/0094671 A1 | 3/2017 | Emmanuel et al. | |
| 2017/0346176 A1 | 11/2017 | Linn et al. | |
| 2017/0359772 A1* | 12/2017 | Lee | H04W 48/16 |
| 2017/0359813 A1* | 12/2017 | Lee | H04W 52/0212 |
| 2018/0007809 A1 | 1/2018 | Kesavaperumal et al. | |
| 2018/0034166 A1 | 2/2018 | Hinman | |
| 2018/0040950 A1 | 2/2018 | Lee et al. | |
| 2018/0151960 A1 | 5/2018 | Scheucher | |
| 2018/0287268 A1 | 10/2018 | Kosaka et al. | |
| 2018/0351264 A1 | 12/2018 | Liu et al. | |
| 2018/0367522 A1 | 12/2018 | Nix | |
| 2019/0103365 A1 | 4/2019 | Singh et al. | |
| 2019/0166636 A1* | 5/2019 | Sahu | H04W 88/10 |

OTHER PUBLICATIONS

International Searching Authority, International Search Report and Written Opinion in related application PCT/US19/56361, dated Jan. 14, 2020; 8 pages.

International Searching Authority, International Search Report and Written Opinion in related application PCT/US20/29940, dated Jul. 20, 2020; 19 pages.

International Searching Authority, International Search Report and Written Opinion for PCT/US2020/033237, dated Jul. 31, 2020; 9 pages.

* cited by examiner

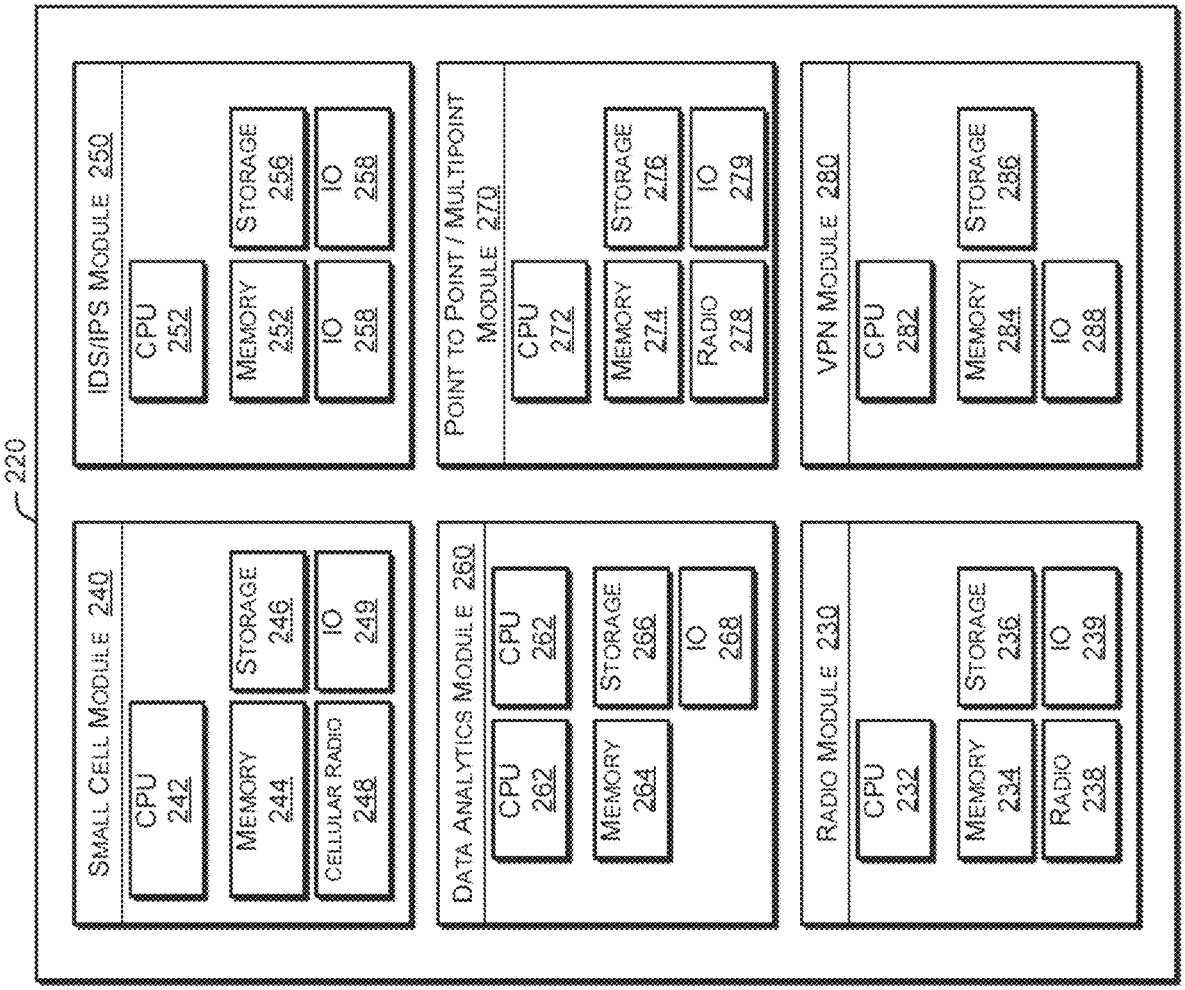
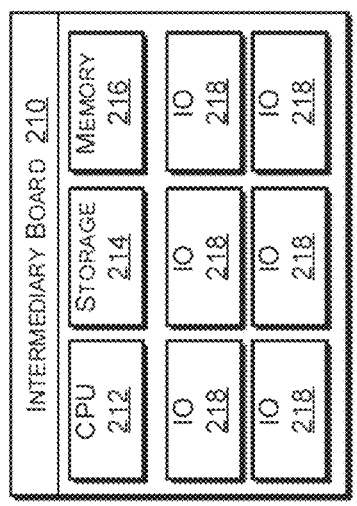
Fig. 5

WIRELESS COMMUNICATIONS SYSTEM WITH SCALABLE ARCHITECTURE

CROSS REFERENCE TO RELATED APPLICATIONS

This application is a continuation-in-part of and claims priority to U.S. patent application Ser. No. 16/161,304 filed Oct. 16, 2018, titled, "Modular Circuit Board for Telecommunications System," which is a continuation of U.S. application Ser. No. 16/161,223, filed Oct. 16, 2018, titled "Wireless Access Point Using Stacked Antennas," the disclosures of which are fully incorporated herein by reference for all purposes.

FIELD AND BACKGROUND OF THE INVENTION

Field of the Invention

The present disclosure relates to systems and methods for providing an improved wireless communications system. More particularly, the present disclosure relates to a configurable wireless communications system with a modular processor that provides a scalable processing support for a variety of antenna and sensor elements within the configurable wireless communication system.

The present disclosure further relates to a modular and scalable processor circuit board for use in a telecommunications network, and particularly for use with a configurable communications module.

Background of the Invention

Wireless networking is becoming increasingly common, offering users the ability to move around from one site to another within a coverage area without having to operate from a wired port in a fixed location. A wireless access point (WAP), also known simply as "access point" (AP), is a networking hardware device on a wireless local area network (WLAN) that allows wireless-capable devices to connect to a wired network through a wireless standard, such as Wi-Fi.

Wi-Fi is a wireless communication scheme conforming to the 802.11 standards of The Institute of Electrical and Electronics Engineers, Inc. (IEEE). In the Wi-Fi scheme, two frequency bands are presently authorized by the Federal Communications Commission for wireless communication, namely the 2.4 GHz and 5.0 GHz wireless radio bands. Each of these wireless radio bands offers different capability. For example, the longer waves used by the 2.4 GHz band are better suited to longer ranges and improved transmission through walls, buildings, and other objects; however, the 2.4 GHz band is more congested and slower in speed. The shorter waves used by the 5 GHz band results in reduced range and diminished ability to penetrate walls and objects, but the 5 GHz band is less congested and transmits at higher speeds.

The 802.11 standard also provides for several distinct radio frequencies within each frequency band. Each distinct radio frequency—or channel—within a frequency band overlaps with adjacent channels on the same frequency band. Traditionally, a WAP is configured with one or more omnidirectional antennas, and the antennas transceivers on a channel within a frequency band. Devices on a channel must share the available bandwidth with all other devices on a channel. Allocation of finite bandwidth on a channel among numerous devices operating in the same geographic area is typically achieved with a multiplexing scheme such as orthogonal frequency division multiplexing ("OFDM").

Wireless access points and other such devices in a telecommunications network are further configured to electrically communicate with electronic circuit boards. In a conventional wireless access point, for example, the omnidirectional antennas of the wireless access point may be configured to electrically communicate with a single electronic circuit board. As a result, an update to any one of the antennas may necessitate replacement of the entire electronic circuit board. Similarly, the subsequent addition of one or more antennas to the conventional wireless access point may require the addition of one or more entirely-new electronic circuit boards.

SUMMARY OF THE INVENTION

The following technical disclosure is exemplary and explanatory only and is not necessarily restrictive of the invention as claimed.

The present disclosure relates to systems and methods for a scalable and configurable modular processor that is used in concert with a configurable communications module using elements such as stacked antenna arrays and environmental sensors. In various aspects, the modular processor of the present invention may be referred to as a modular circuit board.

In some implementations, a scalable and configurable modular processor for use in a telecommunications network may comprise a plurality of modules, each module operable as an independent circuit board and capable of communicating with a device; and a central controller for processing information and distributing workload across the plurality of modules. Each module of the plurality of modules may be interchangeable, removable, and/or customizable.

In other implementations, a method of configuring a wireless access point may comprise mounting a first set of antennas operating at a first wireless radio band in a first layer around a support structure; and mounting a second set of antennas operating at a second wireless radio band in a second layer around the support structure, wherein the first layer and the second layer form a stacked configuration. The method may further comprise dividing at least one of said first layer and second layer into sectors; wherein if said first layer is divided into sectors, each antenna of said first set of antennas is assigned to a different sector; and wherein if said second layer is divided into sectors, each antenna of said second set of antennas is assigned to a different sector.

Embodiments of the present disclosure provide a configurable communications module comprising a plurality of antenna elements organized into a plurality of layers, each antenna element independently accessible and interchangeable within the communications module; a central support structure providing mechanical support for the plurality of layers; and a modular processor in electrical communication with the plurality of antenna elements; wherein the antenna elements within a layer of the plurality of layers operate within one assigned frequency band, each layer of the plurality of layers includes a shielding element to reduce interference with other layers of the plurality of layers, and each respective antenna element is respectively accessible for maintenance and replacement. The communications module may include a housing, wherein at least a portion of the exterior of the housing comprises environmentally protected and electrically transmissive material, for example, a material that is selected and designed to provide minimal signal attenuation of RF signals passing through the housing. The communications module may have any desired number of sections and enclosures, and in one embodiment includes an electronics section and an environmental component interface section. One or more partitions may be interposed between sections in the housing, such as between the electronics section and the environmental component interface section, and the partition may be configured to provide RF shielding between the sections (such as the electronics section and the environmental component interface section). In various embodiments, the partition includes electrical headers to allow electrical interconnect between modules disposed within the electronics section and components disposed within the environmental interface section.

In alternate embodiments, a housing of the present disclosure is removable to access and maintain at least one of the plurality of antenna elements and the modular processor. Antenna elements may be placed in electrical communication with the central controller through a plurality of cables passing within the central support structure, or alternatively, may be connected through direct or indirect wiring.

Antenna elements of the present disclosure may be configured to operate in any desired frequency band or plurality of frequency bands; in one embodiment, the antenna elements in at least one of the layers operate within a 2.4 GHz wireless radio band, or within a 5 GHz wireless radio band, or within a cellular telephony band such as an AMPS-related band, a 3G band a 4G-band, an LTE-band, a GSM-band or a 5G cellular telephony band.

In various embodiments, antenna elements may be arranged in layers, and further, respective layers may be configured to be installed on or removed from the central support structure as a layer unit. Further, in some embodiments, each respective layer may be independently removed from or installed within the communications module without removing other layers within the communications module. In some embodiments, within a layer, antenna elements may comprise a plurality of directional antenna elements oriented in respectively different directions, and in alternate implementations, may include a mix of directional and omnidirectional antenna elements. To assist in removability, in one aspect, respective antenna layers may comprise a C-Shaped layout with a hinged closure.

In one aspect, a modular processor comprises a plurality of radio modules respectively electrically connected to the plurality of antenna elements, and may further be interchanged without replacing the entire modular processor. The communications module also may include an interface from the antenna elements to an external communications network, and a connection to the external communication network may be implemented via any desired protocols and connections such as one or more of a fiber-based connection, a wired connection, and optical connection a cellular backhaul connection or a microwave link. The communications module of the present invention may comprise a variety of communication devices, including one or more of a Bluetooth transceiver and an RFID transceiver. Further, the communications module may further comprise one or more of: a fixed camera, a remotely controllable camera, one or more laser transmitters; one or more laser receivers; one or more laser transceivers; an infrared module; a smoke detector; a carbon dioxide detector; a carbon monoxide detector; an ozone detector; a particulate detector; a microphone; a speaker; an optical communications module; a seismic sensor; a pollution sensing module; a gunshot detector; a lighting apparatus; a weather sensor; an avalanche detector; a tornado warning detector, a wind speed and direction sensor; a traffic sensor; a wireless charging transmitter/receiver/transceiver; a cellular repeater; a point-of-sale (POS) terminal; and a battery; further, any of these components may be installed anywhere on or within the communications module, such as within an accessory module mounted to a housing or a support structure of the communications module.

Antenna elements utilized in aspects of the present disclosure may comprise any desired types of elements such as an omnidirectional antenna element, and antenna elements may comprise a plurality of band transmission cores providing operation within a plurality of operating frequencies. In various embodiments, to ease re-configuration and/or maintenance of the communication module, each antenna element may be interchanged through a socketed connection to the central support structure. Further, in various embodiments, a plurality of antenna elements within a layer operate within a plurality of assigned frequency bands.

Antennas may be placed within certain aspects of the invention in any desired location; for example, where the modular processor is disposed at a first end of the support structure, an omnidirectional antenna element is disposed at an opposite end of the support structure. A 5G cellular antenna element may be placed in any desired location, such as at the bottom of the support structure, the sides of the housing, on a surface of at top member or bottom member of the housing, or any desired location.

In yet another embodiment, a central support structure may be extended by one of: telescoping an internal extension element and mechanically mating an extension thereto.

In a further embodiment, a communications module of the present invention is configured to operate within one of: an urban environment; a rural environment; a building; an airport; a farm; a factory; and a recreation area; and in some embodiments, may further include a solar panel interface that may further be in electrical communication with a battery.

In yet another embodiment, a communications module of the present invention may be configured to monitor any number of factors such as one or more of a soil composition; crop health; animal location; animal health; watering and/or irrigation moisture; oil well pressure; oil well flow; stadium human movement and traffic; human facial recognition; pollution emissions; vehicular traffic flow; a weather condition in proximity to the communications module; a safety-related condition; a crime event; a fire event; and combinations thereof. The communications module provide additional processing capabilities that are useful in a number of venues such as stadiums, performance arenas, and the like; for example, in various embodiments, the communications module is further configured to process one of: point-of-sale (POS) transactions; orders for a product or service to be delivered to a person's assigned seat; instructions to guide a person to a designated location; a person's ticket indicia to grant access to a venue; data obtained from a scan of a QR code displayed by a person in proximity to the communications module; interactive advertising to a person in proximity to an interactive signage; reservation requests for use of a facility; data for use in augmented reality presented on a mobile device; and combinations thereof.

In one additional aspect, at least a portion of an exterior of the communications module may comprise a radome, and the radome may be configured to include an electrically thin dielectric layer, a half-wave thick layer, a foam-core laminate layer, a C-sandwich laminate layer, or a combination thereof. Established specific design considerations for selection of radome composition, structure, and geometries may be utilized by those of skill in the relevant arts, and examples are provided, for instance, in the article, "A Fundamental and Technical Review of Radomes" by Lance Griffiths, Ph.D., MPDigests.com, May 2008, available at http://www.onrampcomm.com/new/AdFiles/MFG%20Galileo_May08%20MPD.pdf, the disclosure of which is fully incorporated herein for all purposes.

In one implementation, an embodiment of the present invention provides a system having a first communications module, the communications module comprising: a modular processor comprising a central controller in electrical communication with a plurality of interchangeable modules; a first interchangeable module of the plurality of interchangeable modules configured as a first radio module in electrical communication with at least one of a plurality of antenna elements disposed within a plurality of layers, whereby the antenna elements within a layer of the plurality of layers are configured to operate within one assigned frequency band; and a second interchangeable module of the plurality of interchangeable modules configured as a network module to communicatively couple the central controller with an external network; and wherein the modular processor is configured to provide wireless data connectivity between the external network and a mobile device in wireless communication with at least one of a plurality of antenna elements. Modules such as the first radio module may be in electrical communication with a plurality of antenna elements disposed within one layer of the plurality of layers, or in communications with multiple antenna elements in the same or respectively different layers. Further, in various embodiments, the plurality of interchangeable modules further comprises a second interchangeable module configured as a second radio module in electrical communication with a second antenna of the plurality of antenna elements disposed within the plurality of layers.

In various implementations, the modular processor further comprises an intermediary board/central controller comprising a bus, a bus connector for electrical and mechanical coupling to the plurality of interchangeable modules; and at least one of an intermediary board and a first module of the plurality of interchangeable modules further comprises: a central processing unit electrically coupled to the bus; a memory electrically coupled to the processing unit; and a storage electrically coupled to the processing unit. The plurality of interchangeable modules may perform distributed processing of tasks allocated by the modular processor, and in one aspect, the modular processor is configured to monitor security access in real time, and the modular processor may be configured to: receive a message from a remote server coupled to the network module; and transmit the message for push processing to an application running on a mobile devices wirelessly coupled to the modular processor. The RF controller may also perform functions such as may be performed by an RF environmental survey, wherein the modular processor is further configured to measure an RF parameter of an environment in proximity to the communications module and optimize allocations of frequencies to achieve a predetermined optimal communications threshold; further, the RF parameter may be selected from a group consisting of: RF noise; electromagnetic interference; frequencies detected from external transmitters; RF reflections; available RF bandwidth; wireless coverage; available data rates; network capacity; RF roaming capability; Quality of Service (QoS); and combinations thereof.

There are many possible implementations that may be supported by the system of the present invention, and in several embodiments, the modular processor is configured to provide a function selected from the group consisting of: detecting occurrence of a gunshot within a defined area; receiving an order from a patron of an entertainment venue; providing an automated interface to an agricultural operation; automating an oil well operation; and combinations thereof. Additional functions performed by the modular processor include: detecting high levels of traffic and optimizing transportation routes by coordinating traffic light sequences and diverting traffic according to conditions; detecting and monitoring chemical seepage, $CO_2$ emissions, and gas levels; monitoring material conditions and vibrations in regard to structural health; controlling access to and monitoring restricted areas via artificial intelligence, CCTVs, and alarm systems; measuring a pressure, level, flow, and chemical content of water; monitoring soil moisture, vibrations, and earth density to detect dangerous patterns in land conditions; and automating building services such as heating, energy usage, lighting, and ventilation to optimize and reduce power consumption and combinations thereof. In additional embodiments to the foregoing, a modular processor of the present invention may perform functions including: optimizing flow of vehicles within a defined traffic monitoring area by: detecting a level of traffic within the defined area indicating an area of traffic congestion; determining an optimal route by analyzing nearby light traffic sequences in proximity to the area of traffic congestion; providing instructions to coordinate traffic light sequences and divert vehicular traffic according to the determination; monitoring an environmental condition regarding a chemical substance, further including: detecting and monitoring chemical seepage level; detecting and monitoring $CO_2$ a emissions level; and detecting and monitoring a gas level; monitoring a condition regarding a material in regard to structural health of a mechanical structure, whereby the condition may include an indicia of metal fatigue, vibration, deformation, cracking, displacement, or combinations thereof; use of artificial intelligence algorithms in controlling access to and monitoring one of: restricted areas, closed-circuit television areas (CCTVs), and alarm systems; measuring, in regards to water, a pressure, a level, a flow rate, a chemical content, and combinations thereof; detecting a condition indicative of a detect dangerous pattern in a land condition, including the monitoring one or more of: a soil moisture content, a soil vibration rate, a soil displacement, a seismograph output, a soil stress indicia, and an earth density measurement; optimizing power consumption of a building by automating one or more of a building heating system, a building energy usage system, a building lighting system, and a building ventilation system; operating a smart parking system within a metropolitan area; monitoring movement of animals with a tracking device within a defined area; and combinations thereof.

Alternatively, the modular processor may be configured to monitor bandwidth allocations based on a use parameter criterion; predict an improved allocation scheme based on the monitored allocations; and re-allocate bandwidth between one or more antenna elements of the plurality of antenna elements. Further in these cases, the use parameter criterion is selected from the group consisting of data use by time of day, data use by frequency, mobile device handover conflict; data use as a function of available bandwidth; power consumption by the communications module; event scheduling; and a predicted change in mobile device users entering RF range of the communications module.

In yet another embodiment, the first radio module of the modular processor is in electrical communication with a first antenna element disposed within a first layer of the plurality of layers, and a second antenna element disposed within a second layer of the plurality of layers. In another aspect, embodiments may further comprise a second radio module, wherein the first radio module is in electrical communication with a first antenna element disposed within a first layer of the plurality of layers, and the second radio module is in electrical communication with a second antenna element disposed within a second layer of the plurality of layers. The interchangeable modules used in various embodiments of the present invention may include any desired type, and the modular processor comprises an interface for electrical communication with an interchangeable module selected from the group consisting of a radio module, a small cell module, a security module, a data analytics module, a point-to-point/multipoint module, a storage module, a power management module, a solar power module, a heat management module, a camera interface module, an environmental sensor interface module, an RFID tracking module, an environmental lighting module, and a VPN module. Further, in various embodiments, "hot swapping" capability of modules is provided, whereby the interchangeable modules may be interchanged while the modular processor is electrically energized and in operational mode. After detecting a change in interchangeable module configuration, the modular processor may take any desired action based upon the configuration change. For example, in various embodiments, the modular processor reconfigures a resource allocation based upon a change in configuration of interchangeable modules that were altered while the controller is in operation. However, additional embodiments also provide for situations where the modular processor reconfigures a resource allocation based upon a change in configuration of interchangeable modules that were altered while the controller was in one of a quiescent state or a powered-down state. Further, the modular controller may allocate a resource based upon at least one of: a request received from an application of a mobile device wirelessly coupled to the communications module; and a remote server coupled to the network module.

Interchangeable modules may be interconnected through any desired bus, protocol, or system; for example, in various embodiments, the interchangeable modules are electrically coupled to the controller through one or more of a PCI Express (PCIe, PCI PCI-e or PCI-X) connection, an Industry Standard Architecture (ISA) connection, an Extended Industry Standard Architecture (EISA) connection, a Micro Channel Architecture (MCA) connection, a Video Electronics Standards Association (VESA) connection, a Peripheral Component Interconnect (PCI) connection, a Personal Computer Memory Card Industry Association (PCMCIA or "PC" bus) connection, an Accelerated Graphics Port (AGP) connection, a Small Computer Systems Interface (SCSI) connection, a Versa Module European (VME) connection, a Firewire (IEEE 1394) connection, and a Lightning bus protocol.

Communications links may be provided in many different arrangements. For example, the system may further comprise: establishing a plurality of communications links to a mobile device through a first communications link associated with a first antenna element of the plurality of antenna elements and a second communications link associated with a second antenna element of the plurality of antenna elements; and controlling, by the modular processor, an allocation of bandwidth between the first communications link and the second communications link. Additionally, embodiments of the present system may further include a second communication module with a second processor, cooperatively operating with the first communication module to manage handover to a mobile device within range of the first and second communication modules. Handover may be managed in any desired manner, such as a break-before-make or make-before-break handover. In yet another aspect, a mobile device may be wirelessly coupled to a first antenna element of the plurality of antenna elements and further wirelessly coupled to a second antenna element of the plurality of antenna elements; and in one additional aspect, a handover of communications between the first antenna element and the second antenna element occurs in reaction to detecting, by the modular processor, that the mobile device is entering a serviced frequency band of the second antenna element.

Embodiments of the present invention may further support pico-, nano-, and small cell systems, and as such, systems of the present invention may further comprise a small cellular network antenna in electrical communications with a cellular radio module electrically coupled to the modular processor. In a further embodiment, the modular processor is configured to provide data connectivity with a plurality of mobile devices wirelessly coupled to the communications module, and wherein the plurality of mobile devices operate within respectively different frequency bands, an in yet another aspect, the modular processor is further configured to allocate a bandwidth criterion between at least two of the frequency bands. Additionally, in various embodiments, the modular processor is further configured to alter a transmitted power from one or more radio modules of the plurality of radio modules. Assigned frequency bands supported by aspects of the invention may be of any type, size, or frequency allocation; for example, assigned frequency bands may be selected from a group consisting of a Wi-Fi band, a 2.4 GHz band; a 3.5 GHz band, a 5 GHz band; a controlled-power custom radio band, and an AMPS, GSM, 3G, 4G, 5G or LTE cellular telephony band.

Embodiments of the present invention may provide automated assistance during the installation and calibration of a communications module in its operating environment. For example, embodiments of the system of the present invention may provide for aspects where the first communications module is further coupled to an installation terminal; and the first communications module provides, through an interface within the installation terminal, one of: status information; antenna tuning information; power-on-self-test information; diagnostic information; instructions regarding antenna pointing to achieve a desired RF performance; and identification and configuration information. The installation terminal may be a dedicated hardware device communicatively coupled to the communications module, a mobile device in proximity to the communications module, or a remote server in communication with the communications module.

Various embodiments provide for a modular processor that may be configured to monitor data transmissions between a mobile device that is wirelessly connected to the communications module and augment a marketing processing database with information related to the mobile device. Modules of the present invention may comprise any desired component type, and may comprise a software defined radio, and may be further configured to service a desired frequency band and/or modulation type.

A plurality of communications modules may be communicatively coupled to provide a wide variety of functions, including allocation of bandwidth, handoff between users, transmission of data through a networked configuration, mesh network implementations, repeating services for wireless devices, and so on. For example, in various embodiments, a communications module may be wirelessly coupled to a second communications module, and the modular processor is configured to: determine a resource allocation between the communications modules; transmit configuration data to the second communication module; and reconfigure a bandwidth allocation according to the determination. In other embodiments of the present invention, the communications module may be communicatively coupled to a remote server through the network; and the modular processor may be further configured to receive resource allocation information from the remote server. Through allocation information, communications modules communicatively coupled through the present invention may interoperate to share and manage communications resources such as bandwidth allocation, resource allocation, co-processing, range extension, and other services.

Additional implementations of the present invention may include a fourth module of the plurality of modules coupled to the modular processor that may be configured to provide an intrusion detection function, and further, the fourth module may be configured with an input node and an output node, and wherein the fourth module may be further configured to provide a pass-through function so that one of the input node and output node allows data traffic to be input and the other node of the input and output nodes allows data traffic to be output. Intrusion protection functions may also be provided by various embodiments; for example, a fourth module of the plurality of modules may be coupled to the modular processor is configured to provide an intrusion protection function, or wherein a fourth module of the plurality of modules coupled to the modular processor may be configured to provide an encrypted Virtual Private Network (VPN) connection to a mobile device in wireless communication with the modular processor. Alternatively, a fourth module of the plurality of modules coupled to the modular processor may be configured to monitor data accessed by the communications module; collect information determined relevant to a data mining schema; and transmit the collected information to the remote server.

Embodiments of the present invention may be configured to support a variety of end applications. For example, a modular processor may be configured with a plurality of interchangeable modules to monitor one or more of a soil composition; crop health; animal location; animal health; watering and/or irrigation moisture; oil well pressure; oil well flow; stadium human movement and traffic; security conditions using human facial recognition; pollution emissions; vehicular traffic flow; a weather condition in proximity to the communications module; a safety-related condition; financial transaction processing; a street lighting condition; smart parking meter operations; a crime event; a fire event; and combinations thereof.

In certain implementations, such as disaster recovery/mitigation applications (e.g., in an area affected by a natural disaster), embodiments of the present invention may provide additional wireless connectivity capabilities to support local wireless users such as first responders. For example, aspects of the present invention provide for any module of the plurality of interchangeable modules configured to operate in one or more mobile walkie-talkie radio bands, police radio bands, citizen radio bands, emergency radio bands, aircraft communication bands, and combinations thereof. A repeater function may be provided, for example, to act as an intermediary between two or more mobile communications devices such as walkie-talkies, and as such, a communications module may be further configured to provide a walkie-talkie repeater function; and further, the communications module may be further configured to provide a walkie-talkie emulator function, whereby a press to talk function is provided to applications executed by mobile devices that are communicatively coupled to the communications module.

The details of one or more implementations are set forth in the accompanying drawings and the description below. Other features, objects, and advantages of the implementations will be apparent from the description and drawings.

BRIEF DESCRIPTION OF THE DRAWINGS

A more complete understanding of the present invention may be derived by referring to the detailed description and claims when considered in connection with the following illustrative figures.

For a more complete understanding of this disclosure and its features, reference is now made to the following description, taken in conjunction with the accompanying drawings, in which:

FIG. 5 illustrates a block diagram of representative modules of the modular processor of FIG. 4, according to the present disclosure;

Like reference symbols in the various drawings indicate like elements.

DETAILED DESCRIPTION

Figure 1:
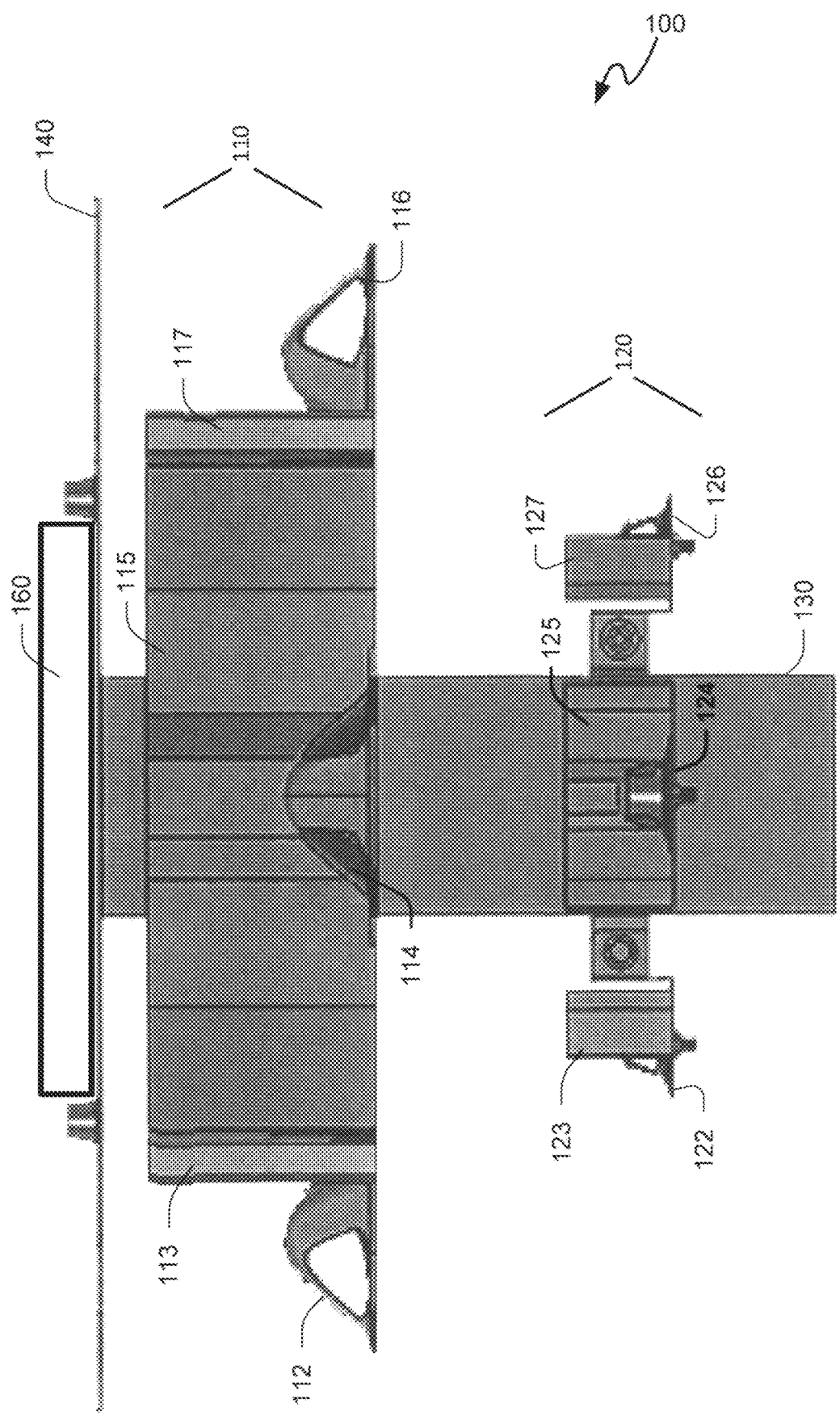
FIG. 1 illustrates a plan view of a wireless access point having a stacked antenna configuration, according to the present disclosure.

Although wireless access points and small cell systems are have been used for some time, the modular and scalable design of the present invention allows communications nodes to be easily augmented, modified, and serviced. More particularly, embodiments of the present invention empower government entities and enterprise organizations to customize a communications module to address particular challenges in the wireless communications space, to modify the modules as requirements change, and to maintain and improve the modules as needed. Through provision of plug-and-play functionality in the software and hardware sides of the platform, customization can be performed months, weeks, or days after purchase. Prior art systems, on the other hand, are usually a one-size-fits-all solution that are difficult, if not impossible, to retrofit after purchase. For one particular example, if a stadium decides that intrusion prevention needs to be enhanced, using embodiments of the present inventions they can add a module to provide the desired functionality, or even swap out modules of lesser importance.

Applications of aspects of the present invention are numerous. Smart Farming applications can utilize communications nodes of the present invention to monitor and control growing conditions to achieve the highest crop efficiency; animal tracking can be utilized to determine health, location, and identification of animals grazing in open pastures or their location in an extensive stable facility; monitoring and control of systems for offspring care to help control or monitor growing conditions of the offspring, among others. Embodiments of the present invention may be equipped with modules specific to the application, such as a plurality of water quality modules and pollution detection modules, and may forego unneeded elements such as a Wi-Fi or LTE module. Should wireless connectivity be required, such elements may be added to the communications module at any desired time.

Conventional wireless access points typically utilize one or more omnidirectional antennas which offer a 360-degree radiation pattern and operate at a singular radio band. Depending upon the implementation, such systems may include limitations on range of coverage, lack of system flexibility, and difficulties in managing system upgrades. Additionally, under conventional systems, migration to new wireless technologies may require a complete replacement of existing wireless access points.

Because Wi-Fi devices operate within a finite spectrum of available bandwidth, the overall performance of a wireless network will decrease as the number of devices and wireless access points within a geographic area increases. As consumers increasingly rely on mobile communications devices, the number of wireless access points in cities and other populated geographic areas will continue to increase. Accordingly, channel congestion will increase, thereby decreasing communications performance for all devices in an area. However, wireless communications performance may be improved when transceivers within a geographic area operate on non-overlapping channels. Performance may be further improved when transceivers operate on different channels from other transceivers within the same geographic area. As consumers increase mobility and demand greater flexibility, the configurable wireless access point described in the present disclosure offers varied options for Wi-Fi connectivity and allows for continued improvement in wireless technology.

Moreover, the one or more omnidirectional antennas utilized by a conventional wireless access point is typically configured to electrically communicate with a single electronic circuit board. Thus, an update to or replacement of one or more antennas may require replacement of the entire electronic circuit board. Likewise, the later addition of one or more antennas to the wireless access point may require the addition of new, corresponding electronic circuit boards. These configurations not only impose physical burdens on the system (i.e., physical space, additional bus structures, wiring, etc.), but also reduce the ease and flexibility desired in a field that is constantly advancing. The modular circuit board described in the present disclosure allows for the configuration of a plurality of independent circuit modules, each of which is independently configurable and interchangeable, thereby minimizing impact to the system as a whole.

Embodiments of the present disclosure are directed to a configurable wireless access point having a stacked antenna array and a modular circuit board for use with the configurable wireless access point. In an implementation, the stacked antenna array may comprise one or more stacked layers of antennas, each layer of antennas directed to a different wireless radio band, and each antenna within each layer of antennas being sectored and directional. As described in detail below, such arrangement increases range of wireless coverage, improves system flexibility, and allows for ease in system maintenance and upgrade.

Figure 2:
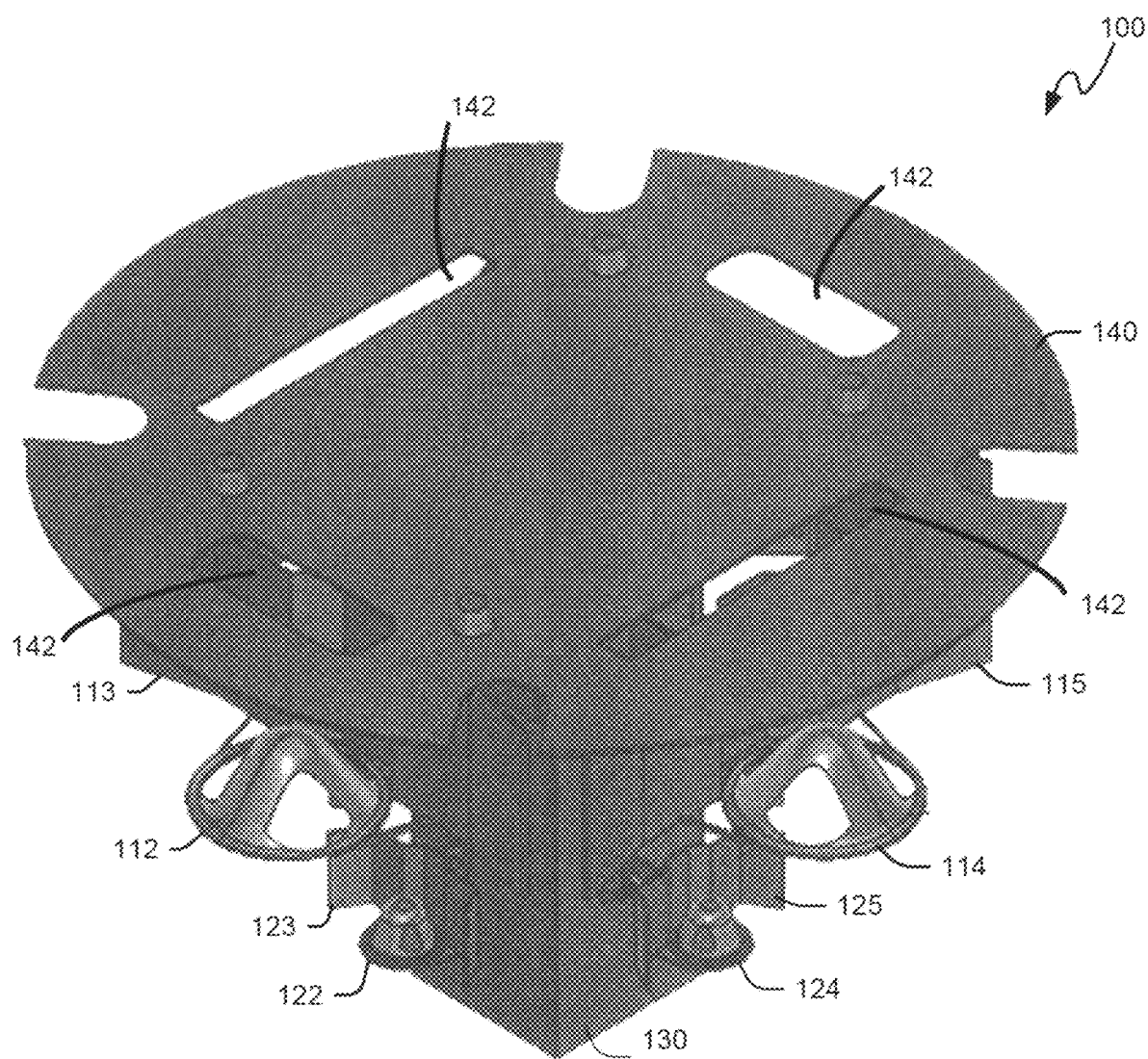
FIG. 2 illustrates a perspective view of the wireless access point having a stacked antenna configuration of FIG. 1, according to the present disclosure.

Reference is made to FIGS. 1 and 2, which depict in plan view and perspective view, respectively, a wireless access point 100 having a stacked antenna configuration according to the present disclosure. Wireless access point 100 may comprise a first antenna layer 110 having one or more antenna 112, 114, 116 operating at a first wireless radio band. The first wireless radio band may comprise, e.g., a 2.4 GHz wireless radio band, a 5 GHz wireless radio band, or other wireless frequency known, used, developed, or to be standardized in the art. The one or more antenna 112, 114, 116 of the first antenna layer 110 may be supported by support structure 130. In an implementation, support structure 130 may comprise a metal support, such as a square pole, round pole, or other similar structure to which the one or more antenna 112, 114, 116 may be affixed. Preferred embodiments shown in FIGS. 1, 2, 7, 12, 15, 16, and 18 include two layers having 4 antenna elements each respectively disposed in four 90-degree quadrants, and in one embodiment, a lower layer operates within a 5 GHz band and an upper layer of antenna elements operates in a 2.4 GHz band. In various embodiments, a radio module (FIGS. 5 and 6, 230) may be connected to and operate one or two antenna elements. Although four antenna elements have been illustrated per layer, those of skill in the relevant arts understand that fewer or more directional antenna elements may be utilized per layer, such as 1 element, 2 elements, 6 elements, 8 elements, or any other desired number.

With continued reference to FIGS. 1 and 2, wireless access point 100 may further comprise a second antenna layer 120 having one or more antenna 122, 124, 126 operating at a second wireless radio band. The second wireless radio band may comprise a wireless frequency different from the first wireless radio band. For example, if the first wireless radio band is designated to a 2.4 GHz wireless frequency, then the second wireless radio band may be designated to a 5 GHz wireless frequency or any other wireless frequency known, used, developed, or to be standardized in the art. The one or more antenna 122, 124, 126 of the second antenna layer 120 may also be supported by support structure 130.

Importantly, the first antenna layer 110 operating at a first wireless radio band and the second antenna layer 120 operating at a second wireless radio band may be arranged in a stacked configuration, i.e., with a first antenna layer 110 stacked atop a second antenna layer 120 and supported by support structure 130, as depicted in FIGS. 1 and 2. One benefit of this configuration is the ease with which the wireless access point 100 may be modified, customized, or upgraded without removing and/or rebuilding the entire configuration. For example, as technology continues to improve, potential changes in the Wi-Fi standard (e.g., to a standard other than the 2.4 GHz or 5.0 GHz wireless frequencies) would not necessitate the removal or rebuilding of the entire wireless access point. Instead, outdated antennas and/or antenna layers may be replaced as needed.

While FIGS. 1 and 2 depict three antennas 112, 114, 116 at the first antenna layer 110 and three antennas 122, 124, 126 at the second antenna layer 120, the present disclosure is not limited to any particular number of antennas or any particular number of antenna layers. As described in detail below, additional antennas may be incorporated at each antenna layer to increase the capacity and directional distance of the wireless access point 100.

With continued reference to FIGS. 1 and 2, in an implementation, the first antenna layer 110 may be sectored to divide up the first antenna layer 110 circumferentially (at least 360°) around the wireless access point 100, i.e., with each of the one or more antenna 112, 114, 116 assigned to a different sector 113, 115, 117. Likewise, the second antenna layer 120 may also be sectored, with each of the one or more antenna 122, 124, 126 assigned to a different sector 123, 125, and 127. Sectorization of antennas at an antenna layer widens the coverage area of the network and therefore increases the number of clients that may be served by the wireless access point 100.

In an implementation, if the first antenna layer 110 is sectored, the one or more antenna 112, 114, 116 in the first antenna layer 110 may comprise one or more directional antenna, each directional antenna assigned to a different sector in the first antenna layer 110. Similarly, if the second antenna layer 120 is sectored, the one or more antenna 122, 124, 126 in the second antenna layer 120 may comprise one or more directional antenna, each directional antenna assigned to a different sector in the second antenna layer 120. Each of the one or more directional, sectored antenna in the first and/or second antenna layer may operate at a designated channel, with adjacent sectors in a given antenna layer operating at different designated channels to reduce signal interference. Channels may be designated and assigned based on interference patterns. For example, channels 1, 6, and 11 may be non-overlapping channels deemed as having minimal interference. Thus, adjacent sectors in a given antenna layer may operate at a different one of channels 1, 6, or 11. By employing sectored, directional antennas, the wireless access point 100 not only increases its capacity, but also increases its directional distance/range.

The one or more sectored, directional antenna may operate in any number of configurations, including, e.g., 120°, 60°, or 30° configurations. In an implementation, a 120° configuration may comprise four sectored, directional antennas arranged circumferentially (to cover at least 360° around the wireless access point 100) and equidistantly around the support structure 130 in the first and/or second antenna layers. This configuration ensures overlap in coverage between adjacent sectors, thereby avoiding gaps in the network. As a result, the Wi-Fi signal of a device of a user traveling between ranges of adjacent sectors may be handed off to the next antenna and thereby minimize signal drop-off.

In another implementation, a 60° configuration may comprise eight sectored, directional antennas arranged around the support structure in the first and/or second antenna layers. In yet another implementation, a 30° configuration may comprise sixteen sectored, directional antennas arranged around the support structure in the first and/or second antenna layers. Although 120°, 60°, and 30° configurations are described, the present disclosure is not limited to any particular configuration or to the use of any particular number of sectored, directional antennas. Moreover, various configurations may be applied to various antenna layers.

Figure 3A:
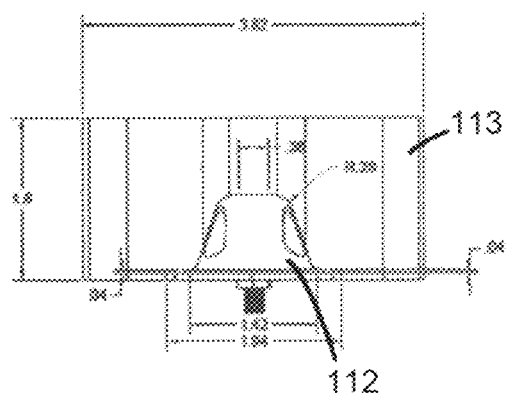
FIG. 3A illustrates a plan view of a single sectored antenna that may be used in a stacked antenna array, according to the present disclosure.
Figure 3B:
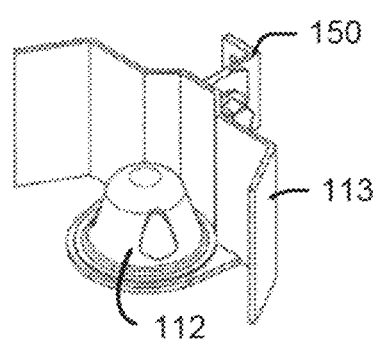
FIG. 3B illustrates a perspective view of the single sectored antenna of FIG. 3A, according to the present disclosure.

Reference is now made to FIGS. 3A and 3B, which depict detailed plan and perspective views, respectively, of a sectored antenna according to the present disclosure. While the antenna shown in FIGS. 3A and 3B is designated antenna 112, it may be any one of the antenna 112, 114, 116, 122, 124, 126 shown in FIGS. 1 and 2. Likewise while the sector shown in FIGS. 3A and 3B is designated sector 113 (corresponding to associated antenna 112), it may be any one of the sectors 113, 115, 117, 123, 125, 127 shown in FIGS. 1 and 2. Importantly, only one antenna may be assigned to each sector. Sector 113 may physically be coupled to support structure 130 via sector mount 150. Sector mount 150 may be removably attached to support structure 130 via screws, bolts, or any other connection means known in the art.

With further reference to the wireless access point 100 of FIGS. 1 and 2, a ground plate 140 may be layered atop the first antenna layer 110 and coupled to support structure 130. Ground plate 140 may serve as a grounding structure and may allow for the placement of one or more electronic circuit boards 160 thereupon. As shown in FIG. 2, ground plate 140 may be configured with slots 142 through which connection wires/cables from one or more electronic circuit boards 160 may be guided for connection to the one or more antennas 112, 114, 116, 122, 124, 126 of the wireless access point 100. Each of the one or more electronic circuit boards 160 may be configured to electrically communicate with the one or more antennas 112, 114, 116, 122, 124, 126 of the first and/or second antenna layers 110, 120, and may include, e.g., a processor, a memory, storage, and other electronic components known in the art.

Figure 4:
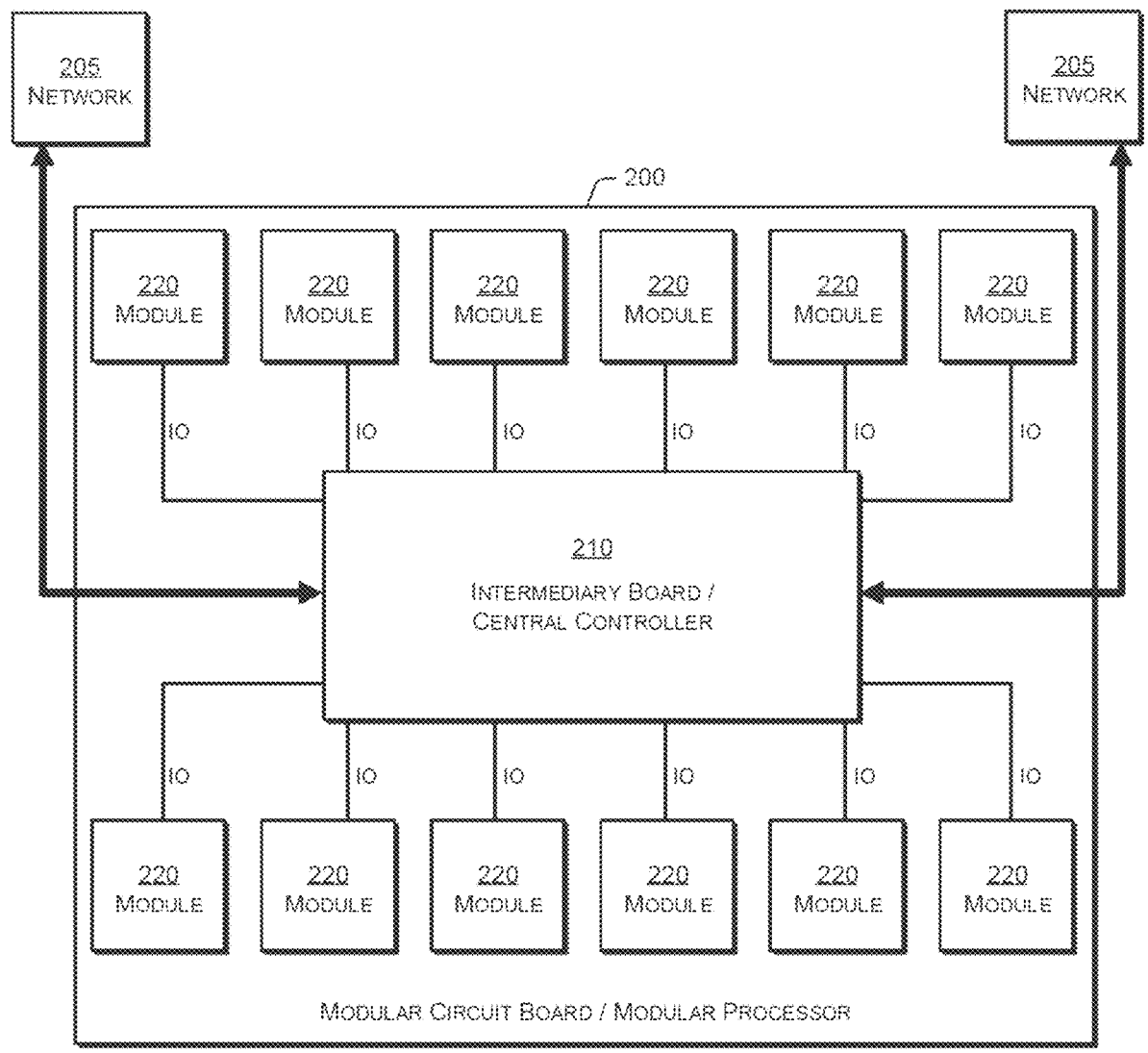
FIG. 4 illustrates a block diagram of a modular processor that may be used in a wireless access point having a stacked antenna array, according to the present disclosure.

With reference now to FIG. 4, according to an implementation, the electronic circuit board 160 for use with the wireless access point 100 may comprise a modular circuit board 200, also referred to herein as a modular processor. Modular circuit board 200 may be mounted on ground plate 140 and may comprise a plurality of modules 220 (collectively numbered 220 in FIG. 4), each module operable as an independent and separate circuit board. In an implementation, each of the one or more modules of the plurality of modules 220 may be assigned to electrically communicate with a separate one of the one or more antennas 112, 114, 116, 122, 124, 126 of the first and second antenna layers 110, 120. In yet another implementation, certain modules of the plurality of modules 220 may be directed to other functionalities that advance the operation of the wireless access point 100. The modular circuit board 200 may further comprise an intermediary board (or central controller) 210 operable to facilitate communication between the plurality of modules 220 and with a network 205, and in various embodiments, a network module provides connectivity between the network 205 and intermediary board/central controller 210. Modular circuit board/modular processor 200 may also comprise one or more connection points for connection to Ethernet, fiber, power, and other such cable connections. Modules 220 may be interconnected to the intermediary board 210 through any desired bus protocol such as, but not limited to, ISA—Industry Standard Architecture, EISA—Extended Industry Standard Architecture, MCA—Micro Channel Architecture, VESA—Video Electronics Standards Association, PCI—Peripheral Component Interconnect—PCI, PCI Express (PCIe, PCI-e or PCI-X), PCMCIA—Personal Computer Memory Card Industry Association (also called "PC" bus), AGP—Accelerated Graphics Port, SCSI—Small Computer Systems Interface, Versa Module European—VME, IEEE 1394 Firewire, Lightning bus protocol, and in a preferred embodiment, comprises a PCI-e bus connection protocol.

Reference is now made to FIG. 5, which depicts block diagrams of components comprising the intermediary board (or central controller) 210 and exemplary modules of the plurality of modules 220 of the modular circuit board 200 of FIG. 4. The plurality of modules 220 may comprise, for example, one or more radio module 230, small cell module 240, security module 250, data analytics module 260, point-to-point/multipoint module 270, and VPN module 280. However, one of skill in the relevant arts can appreciate how the modular architecture may accommodate additional functions or features beyond those listed, and in more or less number than those illustrated.

Intermediary board (or central controller) 210 may facilitate the processing of information and distribution of work load across the plurality of modules 220, and may comprise a central processing unit 212 for processing information obtained from the plurality of modules 220, storage 214 for storing long-term data, memory 216 for storing short-term data, and a plurality of input/output nodes 218 for connection to the plurality of modules 220.

Figure 6:
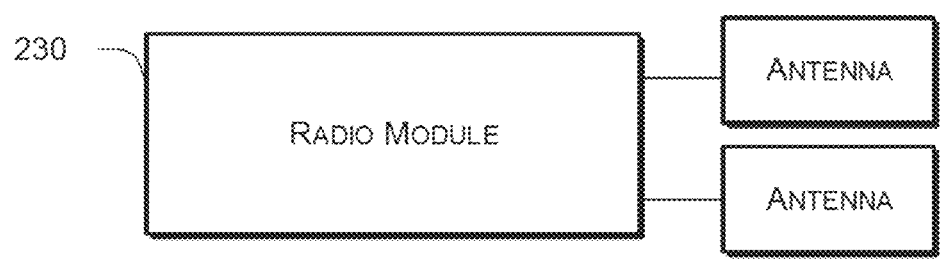
FIG. 6 illustrates a block diagram of an implementation of a radio module of the representative modules of the modular processor of FIG. 5, according to the present disclosure.

Next, the plurality of modules 220 may comprise, for example, one or more radio modules 230, as shown in FIGS. 5 and 6. The one or more radio modules 230 may be configured to provide Wi-Fi radio connectivity for the wireless access point 100. In an implementation, each radio module of the one or more radio modules 230 may be electrically coupled to a separate one of the one or more antenna 112, 114, 116 of the first antenna layer 110 and/or a separate one of the one or more antenna 122, 124, 126 of the second antenna layer 120 of the wireless access point 100. In another implementation, and as shown in FIG. 6, a single radio module 230 may be electrically coupled to two or more antennas in one or more antenna layers. Based on a given number of users and the capacity of the wireless access point, any configuration of radio module 230 to antenna(s) may be accommodated according to the present disclosure. Radio module 230 may offer Wi-Fi 1-6 (formerly, A/B/G/N/AC/AX) coverage and may support a combination of wireless radio bands, including 2.4 GHz and 5 GHz bands, WPA/WPA2/WPA3 encryption, and mesh capabilities. Radio module 230 may comprise, for example, a central processing unit 232, memory 234, storage 236, radio 238, and input/output node 239.

As shown in FIG. 5, the plurality of modules 220 may further comprise small cell module 240. Small cell module 240 may provide cellular wide area network (WAN) connectivity to the wireless access point 100 and support cellular carrier offloading. The small cell module 240 may provide 3G, 4G, and 5G connectivity to the access point, without the need for additional infrastructure. Small cell module 240 may comprise, for example, a central processing unit 242, memory 244, storage 246, cellular radio 248, and input/output node 249.

Security module 250 may add comprehensive security features such as intrusion detection systems (IDS) and intrusion protection systems (IPS). IDS and IPS may parse and interpret network data and host activities. Such data may range from network packet analysis to the contents of log files from routers, firewalls, servers, local system logs, access calls, and network flow data. Security module 250 may comprise, for example, a central processing unit 252, memory 254, storage 256, and input/output nodes 258. Two input/output nodes 258 may be used, operating as a pass-through so that one input/output node allows data traffic in and one input/output node allows data traffic out. This may allow for a more comprehensive analysis of data traffic and identification of vulnerabilities in the system. In other implementations, a single input/output node may also be employed.

Data analytics module 260 may collect data gathered by the wireless access point 100 and send the data to the management platform. The management platform (not shown) may be a server that is utilized for aggregation, processing, and detailed analysis of data gathered by the wireless access point 100. The management platform may reside on a cloud may comprise a physical server stored in a data center. The data analytics module 260 may be used to improve network performance and offer users improved connectivity. Data analytics module 260 may comprise, for example, central processing units 262, memory 264, storage 266, and input/output node 268. At least two central processing units 262 are preferred, allowing for faster processing of gathered data.

Point-to-Point/Multipoint module 270 may offer point-to-point, point-to-multipoint, and multipoint-to-multipoint connectivity for long distances outside the range of mesh capabilities. The operating frequencies may encompass the 900 MHz, 2.4 GHz, 3.65 GHz, and 5 GHz ranges or additional radio frequencies as they are approved for utilization. Point-to-Point/Multipoint module 270 may comprise, for example, a central processing unit 272, memory 274, storage 276, radio 278, and input/output node 279.

VPN Module 280 may provide secure, encrypted connectivity on a per-client basis and may allow the wireless access point 100 to support a large volume of encrypted connections. This type of connectivity may be preferred in environments with specific compliance requirements. VPN Module 280 may comprise, for example, a central processing unit 282, memory 284, storage 286, and input/output node 288.

Although the modular circuit board 200 is described above in conjunction with specific modules (each having specific functionality), it is to be understood that the modular circuit board of the present disclosure may comprise any number of modules having any functionality desired and/or relevant in the art. The number and types of modules on the modular circuit board may be limited only by physical constraints such as limitations on power and bus structures. Additionally, while modular circuit board 200 and modules 220-280 are described above in conjunction with wireless access point 100, it is to be understood that the modular circuit board of the present disclosure may be configured to operate in various applications, for various purposes, and in various systems, particularly in cellular applications and other such telecommunications systems.

Figure 7:
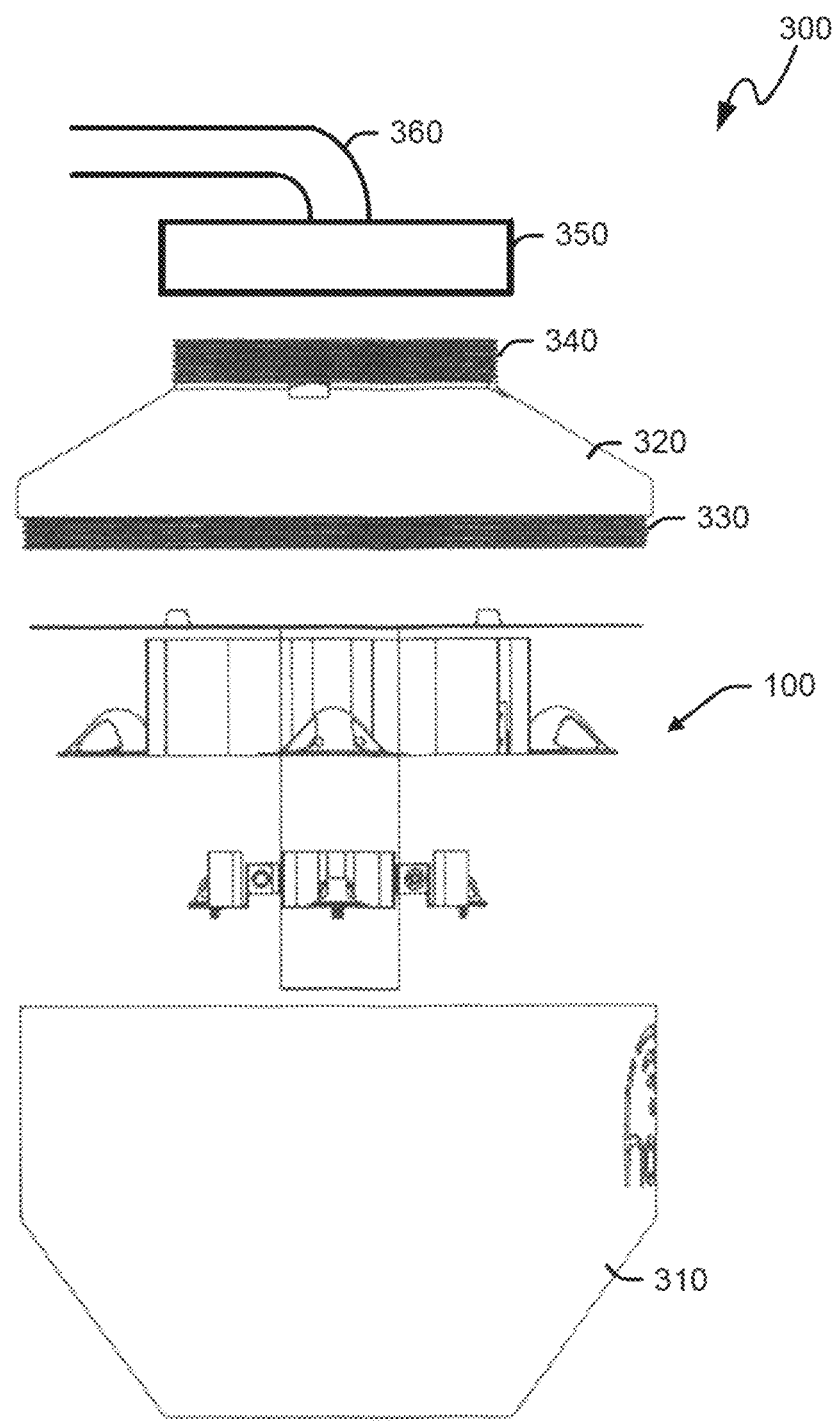
FIG. 7 illustrates an exploded plan view of a housing for enclosing a stacked antenna array, according to the present disclosure.

Reference is now made to FIG. 7, which depicts an exploded view of housing 300 for enclosing a wireless access point 100 according to the present disclosure. Housing 300 may comprise a bottom member 310, which may generally have a bowl-like shape, a top member 320 configured to be coupled to the bottom member 310, and a lid 350 for closing the top of housing 300. Top member 320 may comprise an external threaded ridge 330 configured to matably couple with a corresponding internal threaded portion (not shown) in bottom member 310. Once wireless access point 100 is positioned and secured within housing 300, top member 320 may be secured to bottom member 310. The top member 320 may couple to bottom member 310 such that housing 300 may close in a manner similar to the closing of a lid to a jar. Top member 320 may further comprise an external threaded neck 340 for matably engaging internal threading (not shown) of lid 350. The top surface of lid 350 may further be coupled to conduit 360, a hollow pipe-like connector for connecting to support column 510 (shown in FIG. 10).

Figure 8:
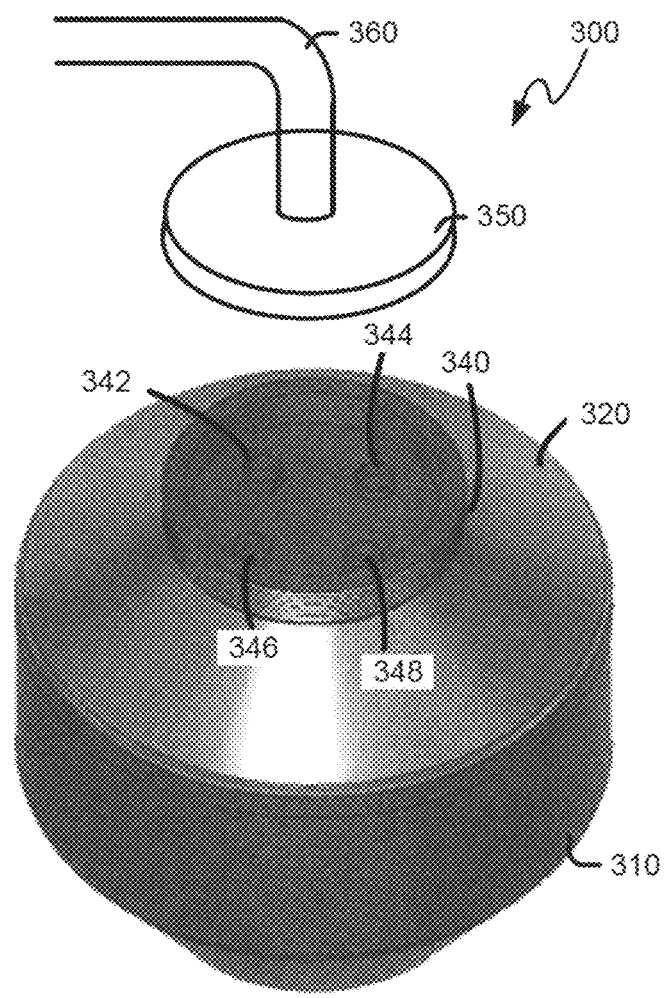
FIG. 8 illustrates a perspective view of an assembled housing for enclosing a stacked antenna array, according to the present disclosure.
Figure 9A:
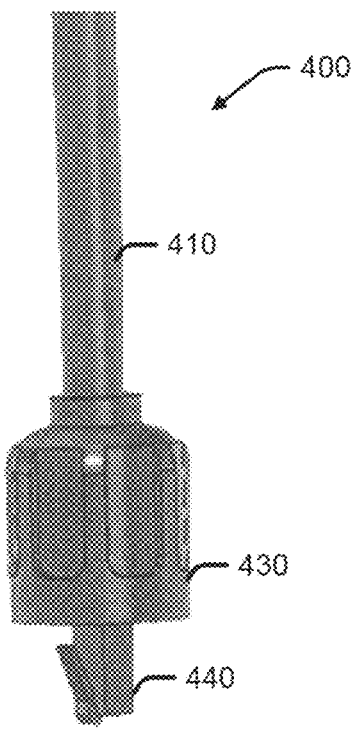
FIG. 9A illustrates a plan view of a cable mount, according to the present disclosure.
Figure 9B:
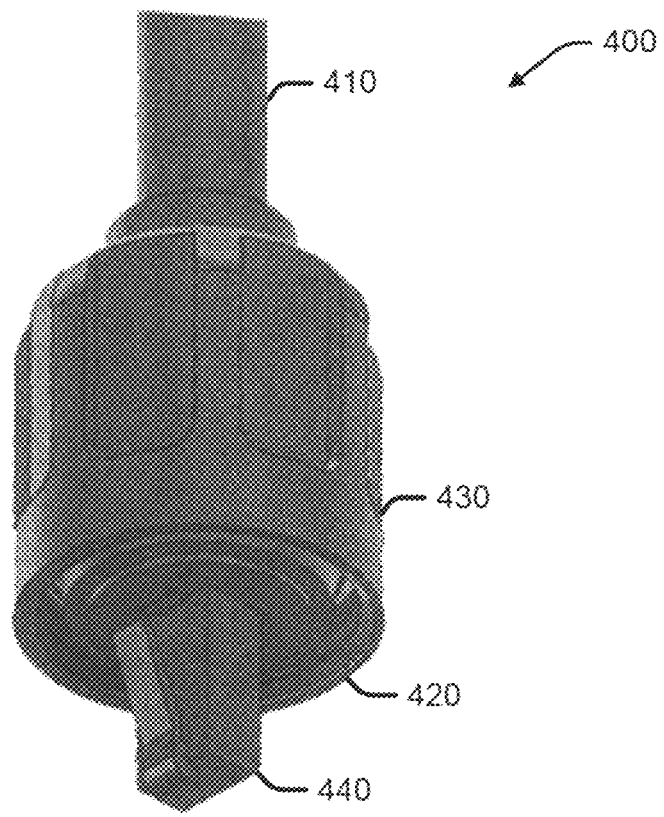
FIG. 9B illustrates a perspective view of the cable mount of FIG. 9A, according to the present disclosure.

Reference is now made to FIG. 8, which depicts a perspective view of partially assembled housing 300, and to FIGS. 9A and 9B, which depict plan and perspective views, respectively, of a cable mount system 400. As shown in FIG. 8, the inside portion of the neck 340 of the top member 320 of housing 300 may comprise one or more cable holes 342, 344, 346, 348. Each cable hole 342, 344, 346, 348 may be configured to receive one cable mount system 400 (shown in FIGS. 9A and 9B). A cable mount system 400 may comprise a cable 410, a mount 420, a cable covering 430, and a coupler 440. Cable 410 may comprise Ethernet, fiber, power, or other such cable that may be connected to the electronic circuit board 160 of the wireless access point I 00. A cable 410 may mount to a cable hole 342, 344, 346, or 348 on housing 300 via cable mount 420, which may be threaded into a cable hole 342, 344, 346, 348. Coupler 440 of the cable mount system may be inserted through a cable hole 342, 344, 346, 348 and into housing 300, where it may be connected to components of the electronic circuit board 160 (of FIG. 1). Cable covering 430 may be disposed over mount 420 and may serve as an impermeable seal to ensure protection of the interior of the housing (including the wireless access point 100) from liquid, particles, or other matter. As shown in FIG. 8, four cables may be mounted to the four cable holes 342, 344, 346, 348 via mounts. Although four cable holes are shown in FIG. 8, the present disclosure is not limited to any particular number of cable holes or corresponding cable mount systems. The mounted cables may be gathered into a single bundle and fed through conduit 360 for connection to a power/control system within support column 510 (FIG. 10).

Figure 10:
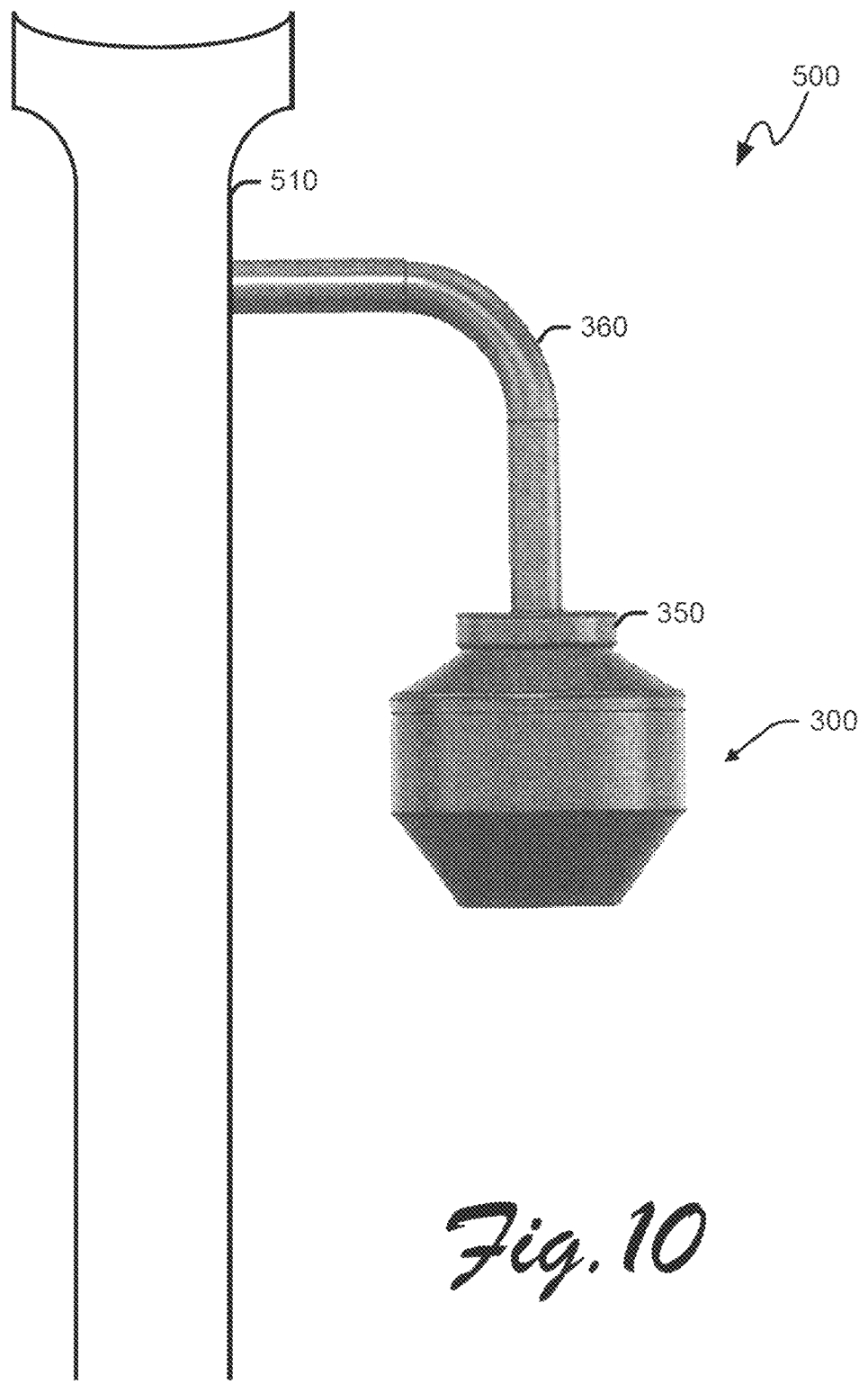
FIG. 10 illustrates an assembled housing coupled to a support column, according to the present disclosure.

Reference is now made to FIG. 10, which depicts a wireless access point assembly 500 according the present disclosure. Cables mounted to the cable holes 342, 344, 346, 348 (FIG. 8) run through conduit 360 for connection to a power and control center housed within support column 510. Support column 510 may resemble a lamp post or other street fixture that may blend into a cityscape. As such, the wireless access point assembly 500 of the present disclosure may be used in connection with smart cities, stadiums, aviation centers, and other highly populated centers where public Wi-Fi connectivity is desired.

With further reference to the previously-described figures, an implementation of a method of configuring a wireless access point according to the present disclosure may comprise: mounting a first set of antennas operating at a first wireless radio band in a first layer around a support structure; and mounting a second set of antennas operating at a second wireless radio band in a second layer around the support structure, wherein the first layer and the second layer form a stacked configuration. The method may further comprise dividing at least one of said first layer and second layer into sectors, wherein if said first layer is divided into sectors, each antenna of said first set of antennas is assigned to a different sector; and wherein if said second layer is divided into sectors, each antenna of said second set of antennas is assigned to a different sector. Incorporating by reference the foregoing paragraphs of the disclosure, the method may further comprise any or all of the steps described above with the respect to the wireless access point 100.

Figure 11:
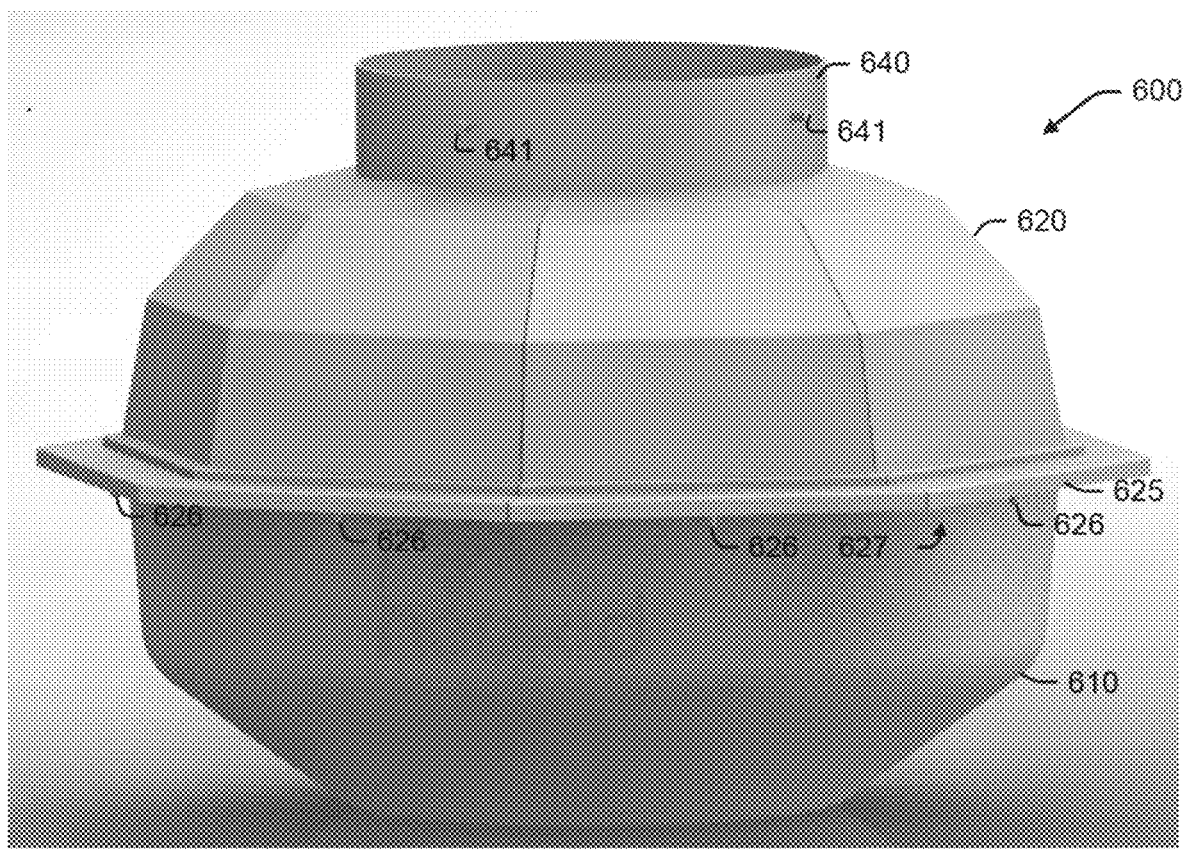
FIG. 11 illustrates a side perspective view of an assembled housing of the present disclosure.

FIG. 11 depicts an embodiment of the present invention showing a housing 600 that includes a top member 630 including a collar 640 with one or more housing fasteners 641, and a connection flange 625 with one or more fasteners 626 engaging with a flange support member 627 that is mechanically coupled to the bottom member 610. The bottom member 610, as also shown in FIGS. 12, 16, 17, 18, and 19, is configured to at least partially cover antenna elements disposed within the communications module 700, and as such, may act as a radome to provide mechanical and environmental protection for such antenna elements. Further, the bottom member 610 may comprise any suitable dielectric-controlled material such as KYDEX® to reduce attenuation of RF signals transmitted from or received by such antenna elements. Radome material may be integrated into the bottom member 610 through molding, stretching a flexible sheet above a frame, or any other desired approach, and may be designed as an electrically thin dielectric layer, a half-wave thick radome, a foam-core laminate, a C-Sandwich laminate, or any other configuration designed to minimize attenuation and optimize performance of the installed antennae elements. Housing fastener 641 secures the housing 600 through collar 640 to an external fixture, which may include but is not limited to a light pole, a conduit, a factory equipment interface, a network controller, a fixture on a farm equipment, a building fixture interface, a buoy interface, a ship or aircraft interface, a vehicle interface, and the like. Fastener 641 may comprise any desired type of fastener such as a set screw, a bolt, a machine screw, a rivet, or a pin for engaging in a bayonet-type interface, wherein the collar is on the inside of a larger fixture collar with keyed slots therein). Likewise, fastener 626 may comprise any desired type of fastener such as a set screw, a bolt, a machine screw, a rivet, or a pin for engaging in a bayonet-type interface. In one embodiment, not illustrated, the fasteners 626 engage within keyhole-type openings within the flange support member 626 so that the bottom member 610 may be rotated with respect to the top member 620, aligning clearing openings in the flange support member 627 with fasteners 626, and as such, the bottom member 610 may be removed by moving the bottom member 610 away from the top member 620 after rotation. When the housing 600 is installed in its intended application, the collar 640 may be disposed substantially inside of an external fixture, or may surround and enclose part of the external fixture. As used herein, the terms "wireless access point" or "wireless access point assembly" may alternatively refer to particular variants of the communications module 700 as described and illustrated herein.

Figure 12:
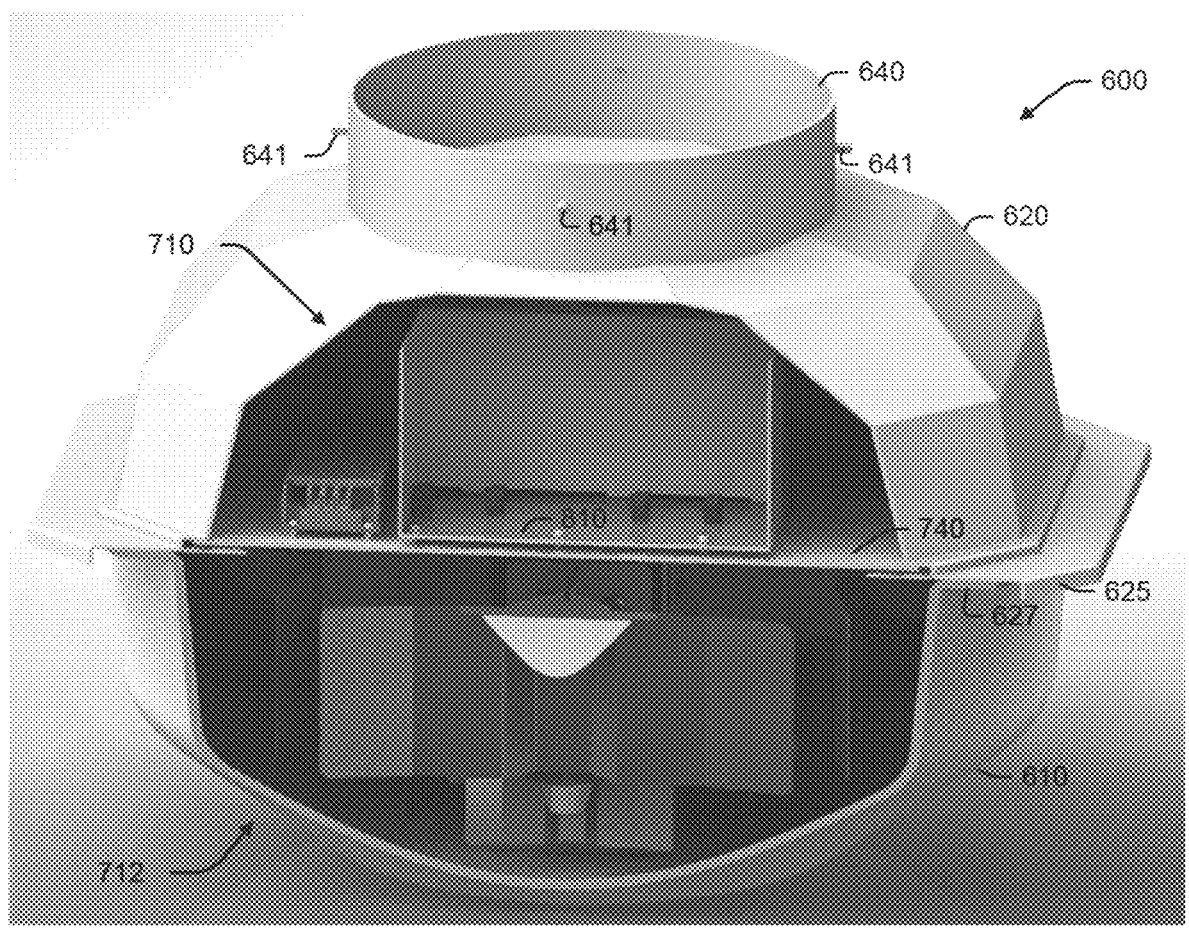
FIG. 12 illustrates a cutaway view of a communications module of the present disclosure.

FIG. 12 illustrates a cutaway view of a communications module 700, showing an opening in the housing 600, an electronics section 710 shown enclosing an intermediary module 810, and an environmental component interface section 712. In various embodiments, a horizontal partition 740 divides the housing 600 into an electronics section 710 and an environmental component interface section 712, and may provide mechanical support for electronics components situated within the electronics section 710 of the housing 600. A flange support member 627 is shown as mechanically coupled to the bottom member 610. In various embodiments, the partition 740 may comprise a ground plane providing electrical and RF shielding between the electronics section 710 and the environmental component interface section 712. Although illustrated with the electronics section 700 disposed in a top portion of the module 700 and the environmental component interface 712 disposed in a bottom portion of the module 700, those of skill in the art appreciate alternative arrangements of the electronics section 710 and the environmental component interface 712 are possible, including, if desired, co-locating electronics components with various components of the environmental component interface section 712.

Figure 13:
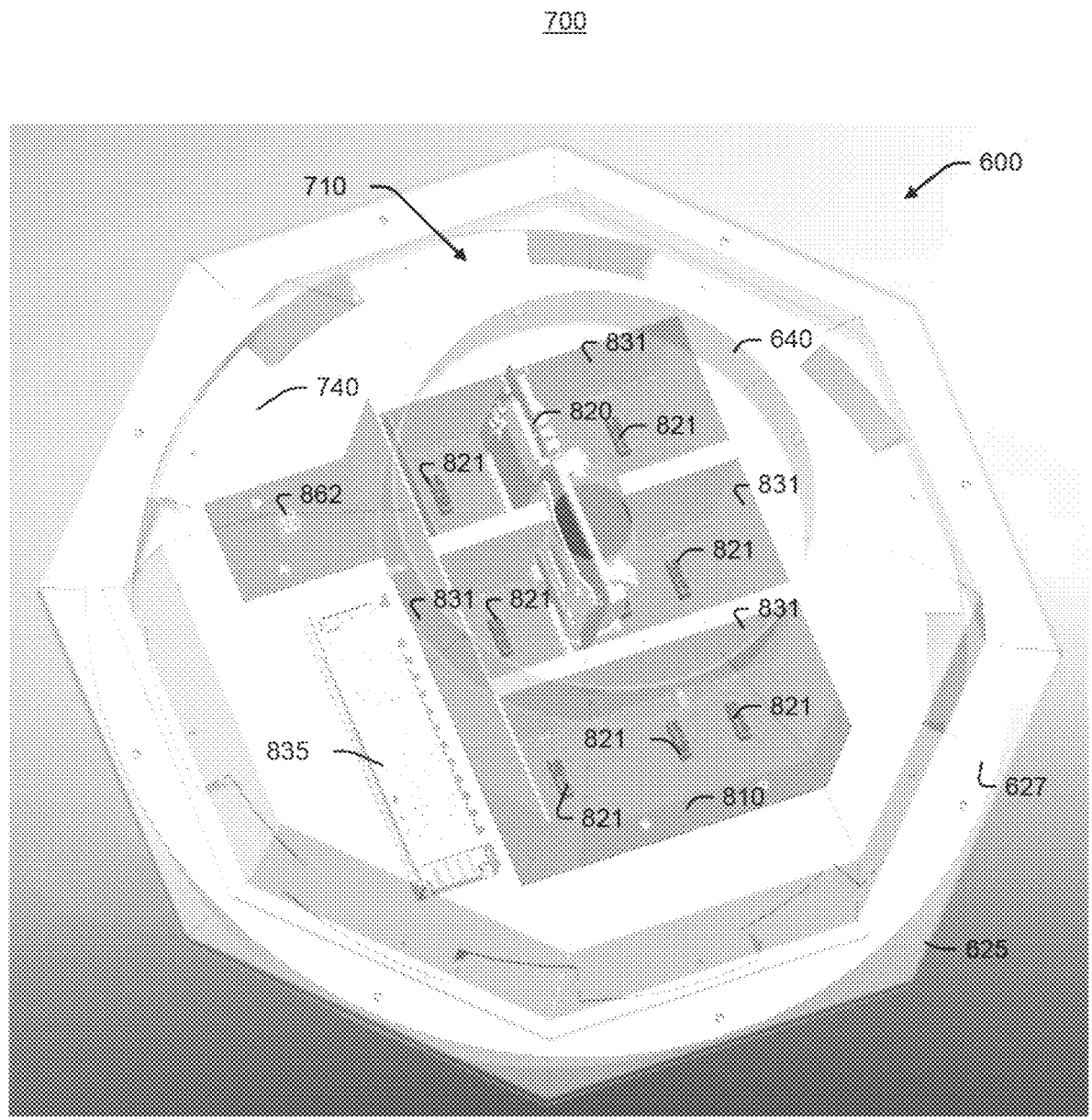
FIG. 13 illustrates a top perspective view of a communications module of the present disclosure, with the top member in semi-transparent rendering.
Figure 14:
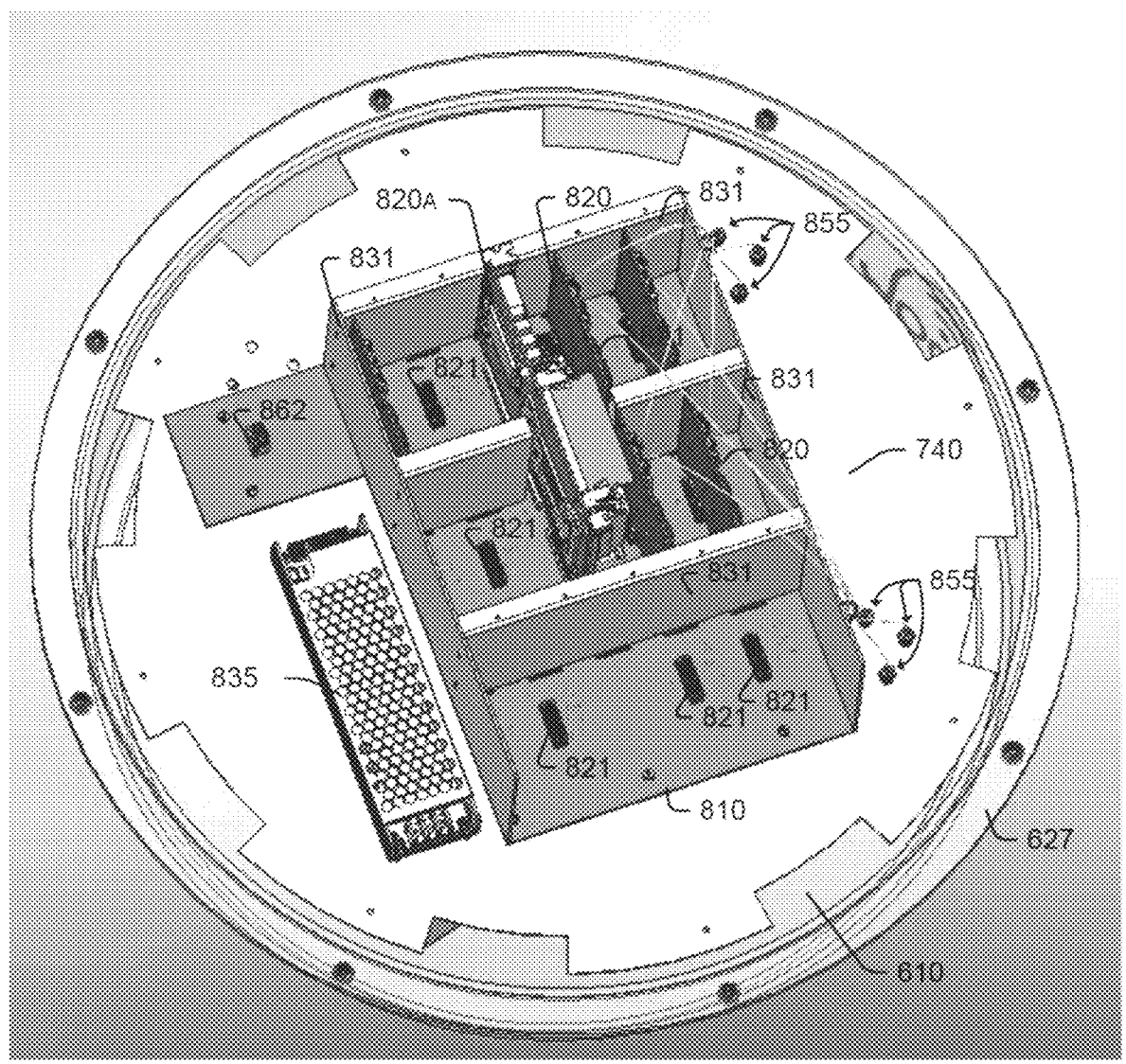
FIG. 14 illustrates a top perspective view of a communications module of the present disclosure, with the top housing member removed.

FIG. 13 illustrates a top perspective view of the communications module 700, with the top member 620 in semi-transparent rendering to illustrate one embodiment of an electronics section 710 of the communications module 700. Further, FIG. 14 shows a similar top perspective view 1400 of a portion of communications module 700, with the top member 620 completely removed. In the illustrated embodiments, on the partition 740, an intermediary board or central controller 810 is disposed, which, when taken together with one or more modules 820, 820A electrically connected through bus connectors 821, may comprise a modular circuit board or modular processor 200 of FIG. 5. A number of components and configurations are illustrated in regards to element 210 in FIG. 5, and is further shown with one or more removable module(s) 820 installed in a bus interface placing the one or more module(s) 820 in electrical communication with the central controller 810, one or more bus interface connectors such as PCI-E connectors 821, shielding/supports 831, power connector 862, and power supply/regulator 835. One or more modules 820, 820A may vary in size, and the shielding/supports 831 may accommodate various sizes of modules such as the longer module 820A in comparison to shorter modules 820; further, the shielding/supports 831 may provide mechanical support for the modules 820, 820A and offer registration slots or pins to ensure proper insertion of modules 820, 820A into connectors 821. In FIG. 13, the top member 620 is shown as transparent, and may be implemented with a transparent, semi-transparent, or opaque material depending on the intended use of the communications module 700. A transparent rendering of the collar 640 and flange 625 are included in one exemplary arrangement as shown in FIG. 13.

Figure 15:
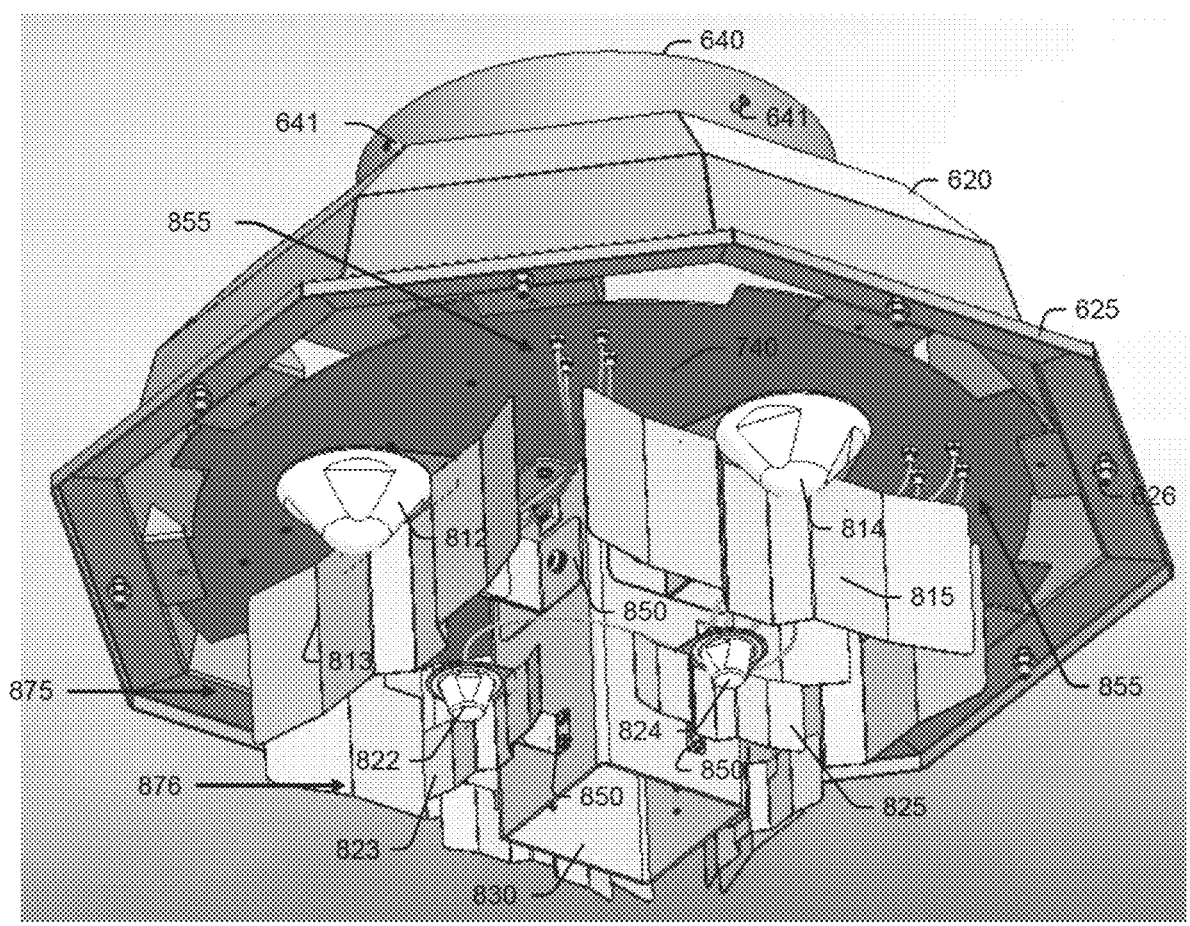
FIG. 15 illustrates a bottom perspective view of an embodiment of the communications module of the present disclosure with the bottom housing member removed.

FIG. 15 shows a bottom perspective view of an embodiment of the communications module 700 with the bottom housing removed. The antenna elements 812, 814, 822, and 824, are respectively disposed in a downward-facing orientation, as opposed to the upward-facing orientation shown for antenna elements 112, 114, 116, 122, 124, and 126 as shown in regards to FIGS. 1, 2, 3A, and 3B; in embodiment utilizing the downward-facing orientation, improved RF performance may result when the communications module 700 is mounted at a vertical height above the intended communication targets, such as when being mounted on a pole with persons carrying mobile devices disposed at a level below the communications module 700. In other embodiments, the antenna elements may be mounted in any desired orientation to optimize RF performance in the external environment in which the module 700 operates. Similar to the embodiments described in regards to FIGS. 1, 2, 3A, and 3B, antenna elements 812, 814, 822, and 824 are respectively installed in shielded sectors 813, 815, 823, and 824, and respectively attached to central support structure 830 through mounting structures 850. Further, antenna elements antenna elements 812, 814, 822, and 824 are shown electrically coupled to coax bulkhead headers 855 that allow signals to pass through the partition 740 to allow electrical coupling to the central controller 810 and/or modules 820. In one embodiment, wiring from the antenna elements 812, 814, 822, and 824 may comprise coaxial cabling electrically coupling the antenna elements to the coax bulkhead headers 855. Correspondingly, (and as shown in FIG. 14) on an opposite side of the partition 740, the coax bulkhead headers 855 are electrically coupled to coaxial cables providing respective electrical connections between the coax bulkhead headers 855 and respective modules 820 and/or the central controller 810.

Figure 16:
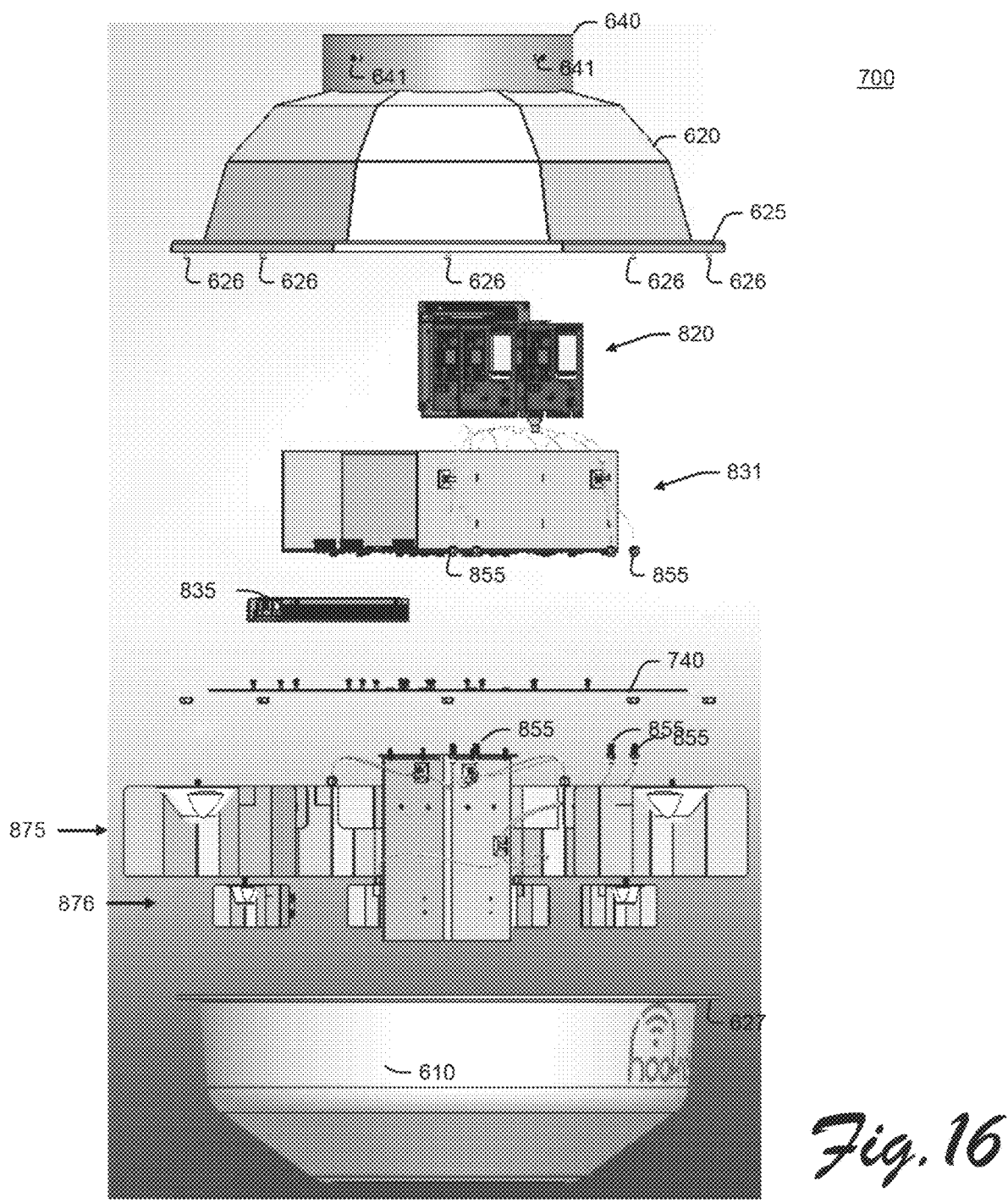
FIG. 16 illustrates a side exploded view of an embodiment of the communications module of the present disclosure.

Similarly as discussed in regards to FIGS. 1, 2, 3A, and 3B, the antenna elements shown in FIG. 15 are arranged in two layers, with antenna elements 812, 814, in respective sectors 813, 815 are disposed within a first layer 875, and the antenna elements 822, 824, in respective shielded sectors 823, 825, are disposed within a second layer 876. Although the illustrated embodiment shows an arrangement with two layers having four sectors/antennas per layer attached to the central support structure 830, any number of desired antennas may be assigned to any particular layer, and any desired number of layers may be used in the communications module 700. Further additional components may be attached to the central support structure 830, and may include a wide variety of devices. For additional reference, FIG. 16 illustrates a side exploded view of an embodiment of the communications module 700, with reference numerals corresponding to elements described in regards to FIGS. 11-15.

Figure 17:
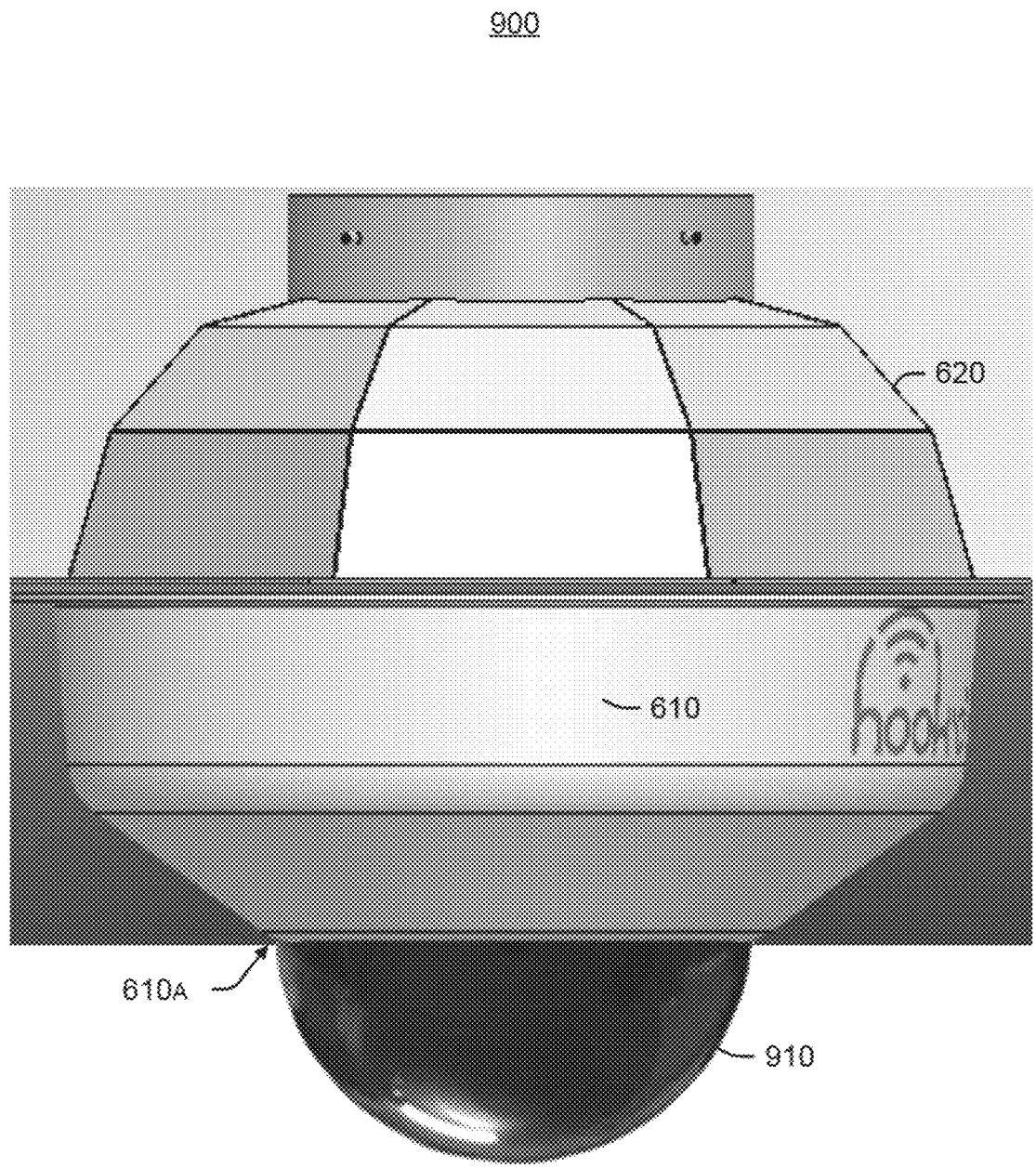
FIG. 17 illustrates a side view of an embodiment of the communications module of the present disclosure, showing an attached accessory module.

FIG. 17 illustrates a side view of an embodiment of the communications module 900 of the present invention. Bottom member 610 may include a distal portion 610a, to which an accessory module 910 may be sealably attached. In one embodiment, distal portion 610A includes an opening through which mechanical and electrical connections to the accessory module 910 are completed, and such opening may be optionally mated to the accessory module through a gasket or seal to provide environmental protection of the interior components. Accessory module 910 may include any number of components as desired, such as a fixed camera, a remotely controllable camera (such as a remotely rotatable and zoomable camera), one or more laser transmitters/receivers/transceivers; an infrared module; a smoke detector; a carbon dioxide detector; a carbon monoxide detector; an ozone detector; a particulate detector; a microphone; a speaker; a laser transmitter/receiver/transceiver; an optical communications module; a seismic sensor; a pollution sensing module; a gunshot detector; a lighting apparatus; a weather sensor; an avalanche detector; a tornado warning detector, a wind speed and direction sensor; a traffic sensor; a wireless charging transmitter/receiver/transceiver. Although the aforementioned devices are described as being included within the accessory module 900, those of skill in the relevant arts understand that such components may be disposed anywhere within the communications module 900. Cameras disposed within the accessory module 910 may be of the still frame capture variety or may be video cameras or may provide either function as desired. Such cameras may be equipped, for example, to scan QR codes presented in proximity to the communications module, track and remotely transmit images or video data regarding a condition in proximity to the communication module, or to obtain image data to support human facial recognition or crowd flow information. In instances where cameras are situated within the accessory module 910, the outer housing of the accessory module 910 may be transparent, or at least partially transparent, and may be tinted as illustrated to at least partially conceal cameras located within accessory module. Components within the accessory module may be in electrical communication with the central controller 810, such as through a wired connection that extends between the components and the controller 810 through an interior space of the support structure 830, or around an outside surface of the support structure 830.

Figure 18:
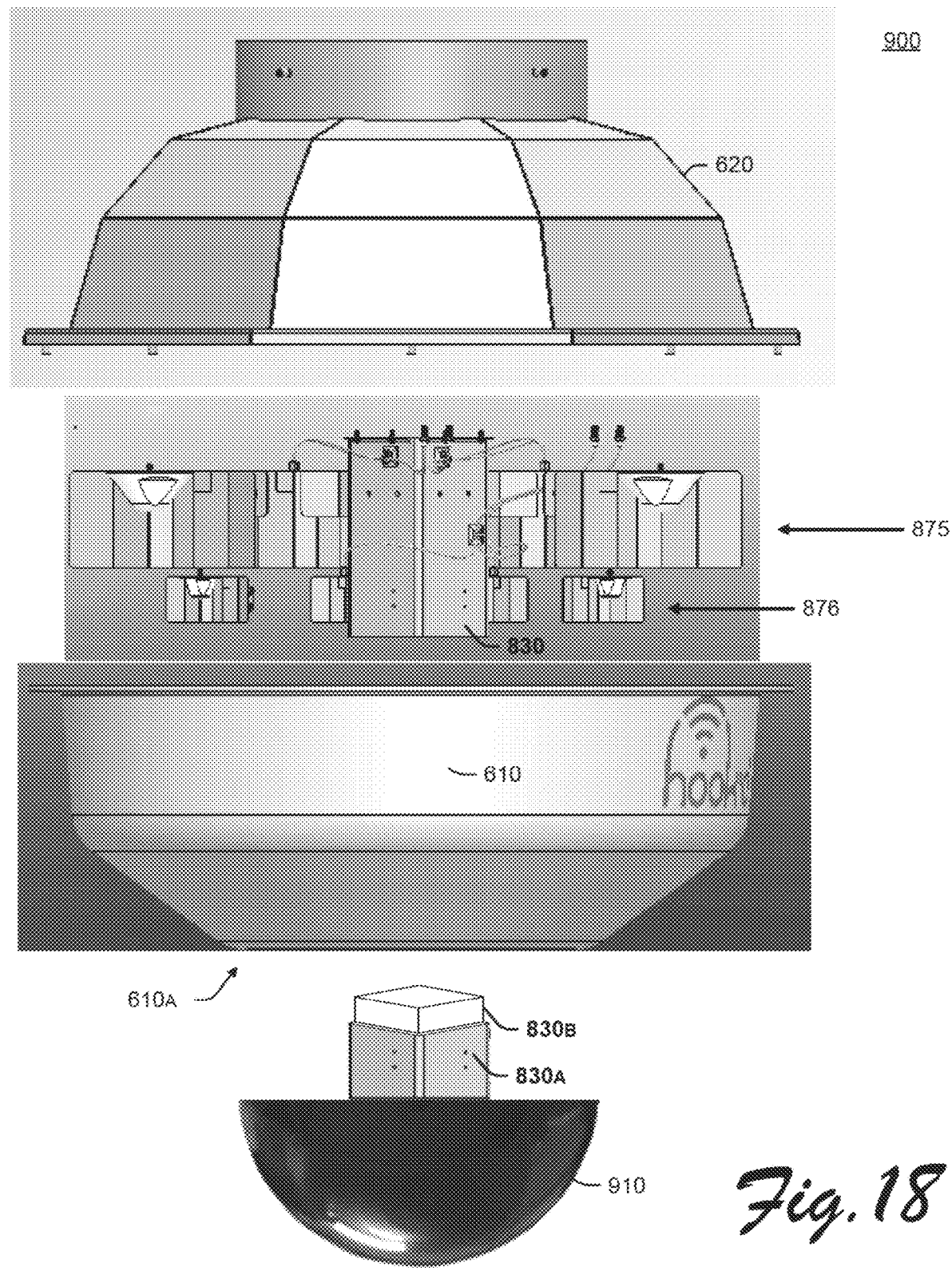
FIG. 18 illustrates a side exploded view of the communications module that illustrated in FIG. 17.

FIG. 18 illustrates a side partially-exploded view of the communications module 900 that was illustrated in FIG. 17. Two antenna layers 875, 876 are shown as situated between the top member 620 and the bottom member 610, and the accessory module 910 is shown with a support structure extension 830A, which, when installed, extends through distal portion 610A of the bottom member 610 to interface with the support structure 830. As shown, the support structure extension 830A also includes a flanged portion 830 be which is configured to engage within the support structure 830 to allow registration of the support structure extension 830A with the support structure 830. In one embodiment, when accessory module 910 is attached to bottom member 610, the bottom member 610 and accessory module 910 may be removed from the communications module system 900 as a unit. In an alternative embodiment, communications module 910 is a fixed to the central support 830 through the support extension 830B, 830B and is configured to allow the bottom member 610 to be removed over the accessory module 910 while the accessory module 910 still remains attached to the support structure 830. In such a circumstance, a gasket may be disposed within the bottom member 610 to provide for environmental sealing between the bottom member 610 and accessory module 910 and is configured to allow the bottom member 610 to be slidably removed over the accessory module 910.

Figure 19:
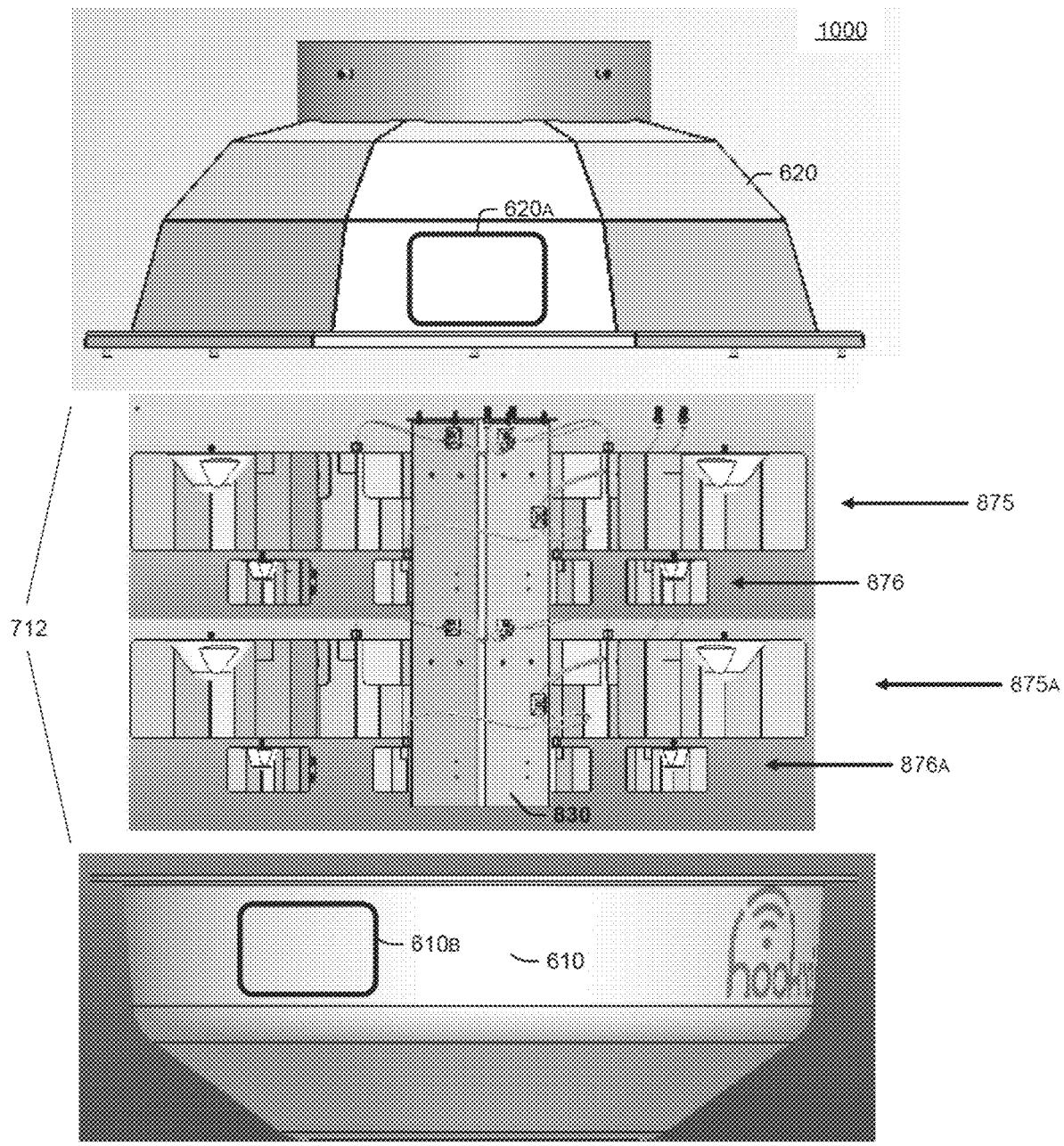
FIG. 19 illustrates a side exploded view of a communications module of the present disclosure.

FIG. 19 illustrates a side partially-exploded view of a communications module 1000 of the present invention. In the illustrated embodiment, environmental component interface section 712 includes four layers of antennas 875, 876, 875A, and 876A. Before antenna layers are shown disposed around and attached to support structure 830. As can be appreciated by those of skill in the relevant arts, any number of antenna layers may be included within the communications system 1000, and the system may be configured as desired for the intended implementation. Furthermore one or more horizontal RF shielding plates or ground planes, such as a metallic disc (not shown) may be interposed between any of the antenna layers to reduce crosstalk and optimize RF performance of the respective antenna layers. Although antenna layers 875, 876, 875A, and 876A are shown with fixed directional antenna elements, in alternative embodiments, each layer may be locally or remotely tunable by adjusting orientation of the antenna elements and/or through electronic beam-forming approaches, or a combination of both approaches. In addition, although antenna layers 875, 876, 875A, and 876A are shown installed and in proximity to one another, in one embodiment, as depicted further in regard to FIG. 20, the layers may be individually removable, improving maintainability and upgradability by reducing the need to completely disassemble the communications module 1000. In one aspect, individual antenna elements may also be individually interchangeable through a socketed connection within the layer; in this embodiment and others, an antenna layer may comprise a diversity of antenna elements operating in different frequency bands as desired to support the intended operational environment of the communications module. In certain embodiments a cylindrical housing extension (not shown) with an interior diameter approximating that of the top member 620 and bottom member 610 may be inserted between the top member 620 and the bottom member 610 to provide environmental protection for the extended antenna array layers shown in the environmental component interface section 712. Further, in various embodiments, the extension may be an integral part of the top member 620 or the bottom member 610 depending on details of the particular implementation.

In various embodiments, communications module 1000 may operate cellular small cell antennas, radio units, and baseband interfaces to support local small cell implementations through the communications module 1000. One or more antennae may be integrated within the top member 620 or bottom member 610 of the communications module 1000, such as millimeter-wave patch antenna, an array of dual-polarized antenna elements, a phased array antenna, and the like. In one alternative embodiment, the members 610 and/or 620 may be rotated on the unit about the central support structure 830 to tune or point integrated antennae in a desired direction to achieve optimal RF performance; in one case, in an implementation of a massive MIMO (multiple-input, multiple-output) array, an included cellular base station comprising of a plurality of antennas may be optimized for bandwidth performance by rotating elements of the top member 620 or bottom member 610 with respect to the installed environment.

The bottom member 610 or top member 620 may comprise an additional antenna elements (such as 610B 620A) mounted within, inside, outside of the housing. In certain embodiments, mounting one or more antenna elements within or outside the radome may result in improved RF performance, particularly in millimeter-wave applications such as 5G telephony. Antenna elements 610B, 620A may be electrically coupled to the central controller 810 to allow transmission of signals and/or power to the antenna elements 610B, 620A.

Figure 20:
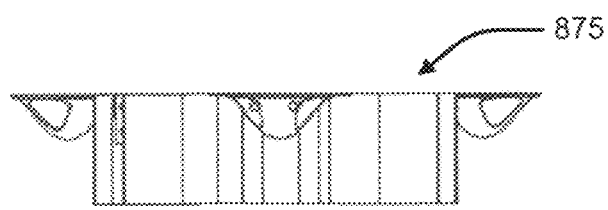
FIG. 20 illustrates a side view of an exemplary antenna layer of the present disclosure.
Figure 21:
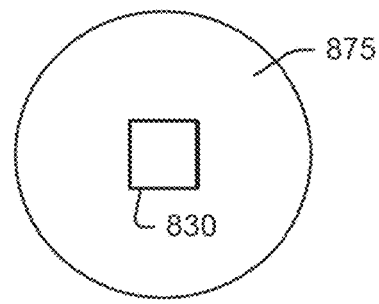
FIG. 21 illustrates top profile view of an antenna layer of the present disclosure depicted in proximity to a central support structure.

FIGS. 20 through 24C depict various embodiments for interchangeable antenna layers. FIG. 20 shows a side view of an antenna layer 875, and its corresponding top profile view depicted as an approximate circle in FIG. 21 with a cross-sectional view of the support structure 830 situated within the antenna layer 875. In one embodiment, antenna layer 875 may be slid onto the support structure 830 as a single unit, and affixed thereto using any desired fastening technique. In alternative embodiments, it may be desirable to install an entire antenna layer without needing to remove adjacent antenna layers from the support structure 830. In such an instance, antenna layers may be configured to have openable portion to allow installation and removal from the central support structure 830. Although in FIGS. 20 through 24, and in other figures described above, the central support structure is approximately square in cross-section, any desired shape may be utilized to achieve any desired purpose, and circular, elliptical, triangular, polygonal, or any desired cross-section may be utilized for the support structure 830, and different cross-sections may be utilized in concert with different antenna layers to support dimensional changes antenna elements.

Figure 22A:
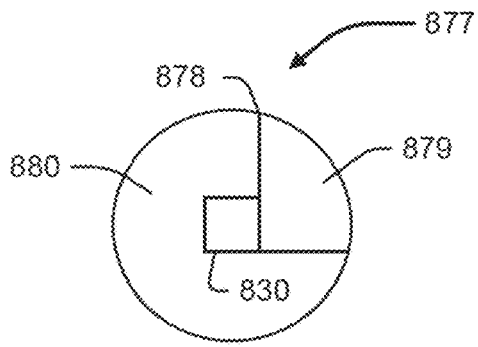
FIGS. 22A-22D illustrate a removable antenna layer embodiment of the present disclosure with a hinged section.
Figure 22B:
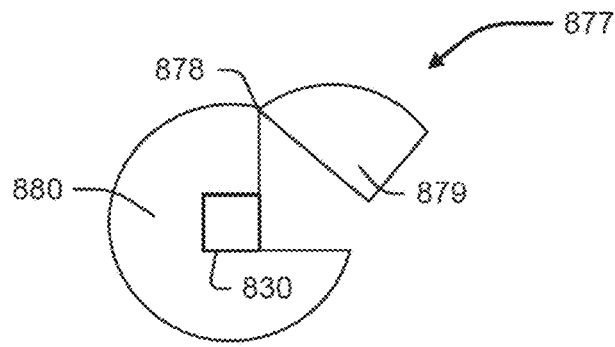
Figure 22C:
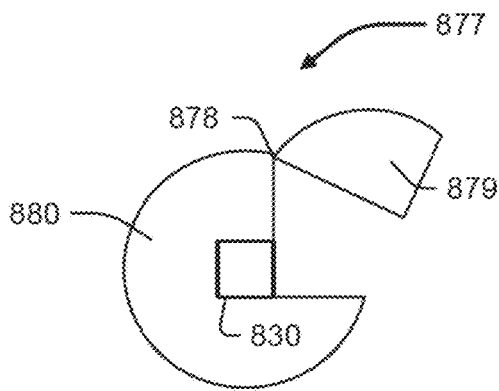
Figure 22D:
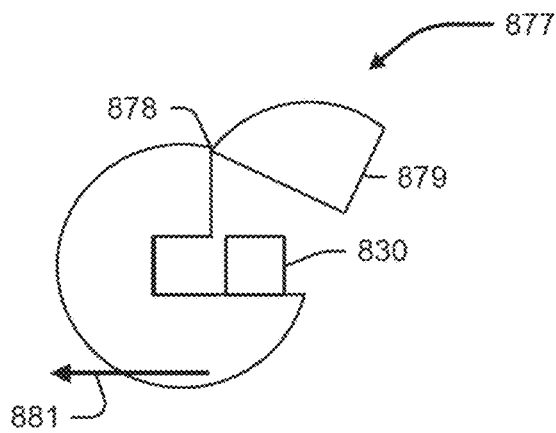

In FIGS. 22A through 22D, top views of antenna layer profile 877 include a movable portion 879, hingedly connected 878 to a C-Shaped second section 880 of the antenna layer 877. A fastener such as a locking clamp, not shown, may be used to secure the movable portion 879 to the second section 880. The central support structure 830 is shown in cross section in the center of the antenna layer 877. FIGS. 22B and 22C show the movable section 879 being opened hingedly in an outward direction (after any fasteners were released), exposing the central support structure 830 and creating a void to allow removal of the antenna layer 877. FIG. 22D shows the antenna layer 877 then being moved 881 to allow removal of the antenna layer 877 from the central support structure 830. Installation of such an antenna layer 877 may be accomplished in the reverse order.

Figure 23A:
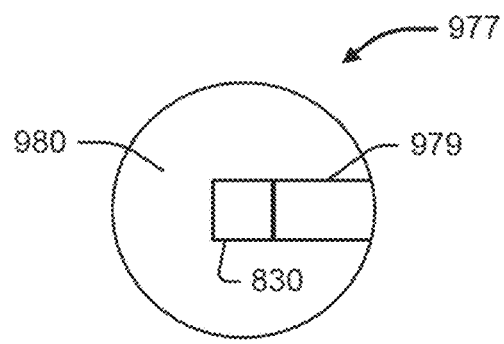
FIGS. 23A-23D illustrate an alternate removable antenna layer embodiment of the present disclosure with a removable section.
Figure 23B:
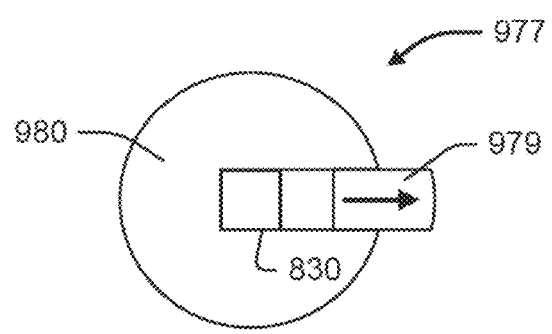
Figure 23C:
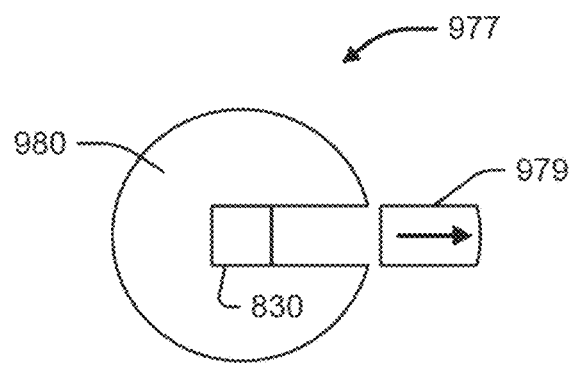
Figure 23D:
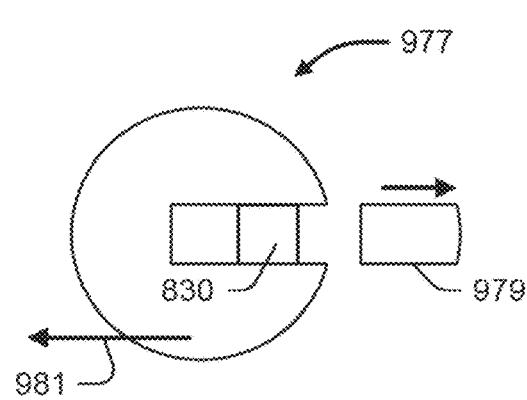

In FIGS. 23A through 23D, top plan views of antenna layer profile 977 include a movable portion 979, removably connected to a second C-Shaped section 980 of the antenna layer 977. One or more fasteners such as locking clamps, not shown, may be used to secure the movable portion 979 to the second section 980. The central support structure 830 is shown in cross section in the center of the antenna layer 977. FIGS. 23B and 23C show the movable section 979 being removed in an outward direction (after any fasteners were released), exposing the central support structure 830 and creating a void to allow removal of the antenna layer 977. FIG. 23D shows the antenna layer 977 then being moved 981 to allow removal of the antenna layer 977 from the central support structure 830. Installation of such an antenna layer 977 may be accomplished in the reverse order.

Figure 24A:
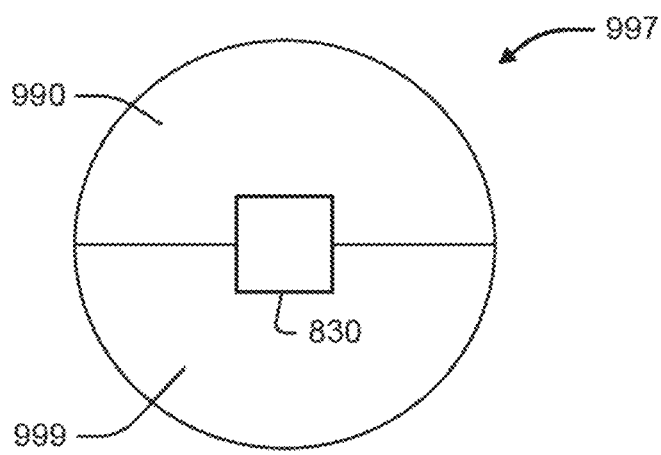
FIGS. 24A-24C illustrate a separable and removable antenna layer embodiment of the present disclosure.
Figure 24B:
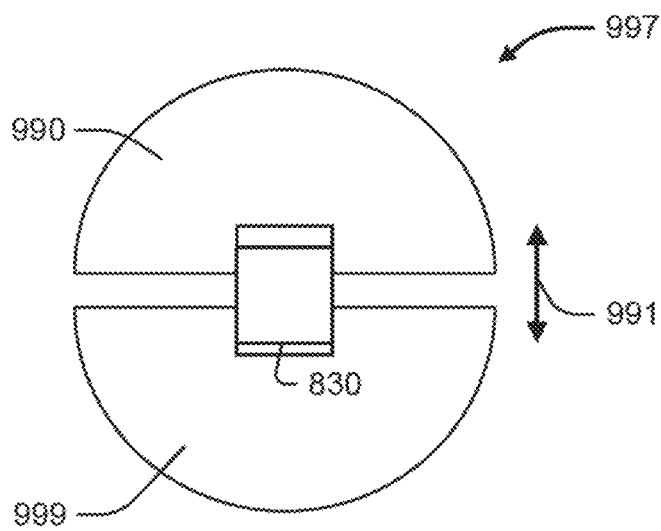
Figure 24C:
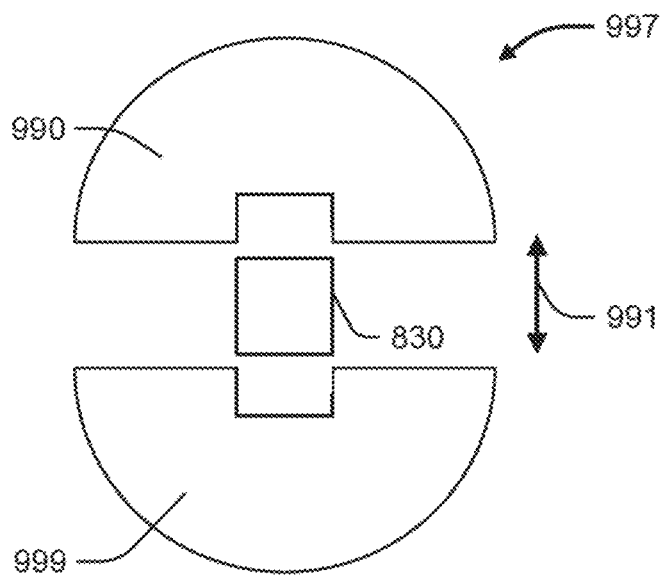

In FIGS. 24A through 24D, top plan views of antenna layer profile 997 include movable sections 999 and 990 of the antenna layer 997. One or more fasteners such as locking clamps, not shown, may be used to secure the movable sections 999 and 990 together. The central support structure 830 is shown in cross section in the center of the antenna layer 997. FIGS. 24B and 24C show the sections 999 and 990 being removed in an outward direction (after any fasteners were released), exposing the central support structure 830 and allowing removal of the antenna layer 997 from the central support structure 830. Installation of such an antenna layer 997 may be accomplished in the reverse order.

Figure 25:
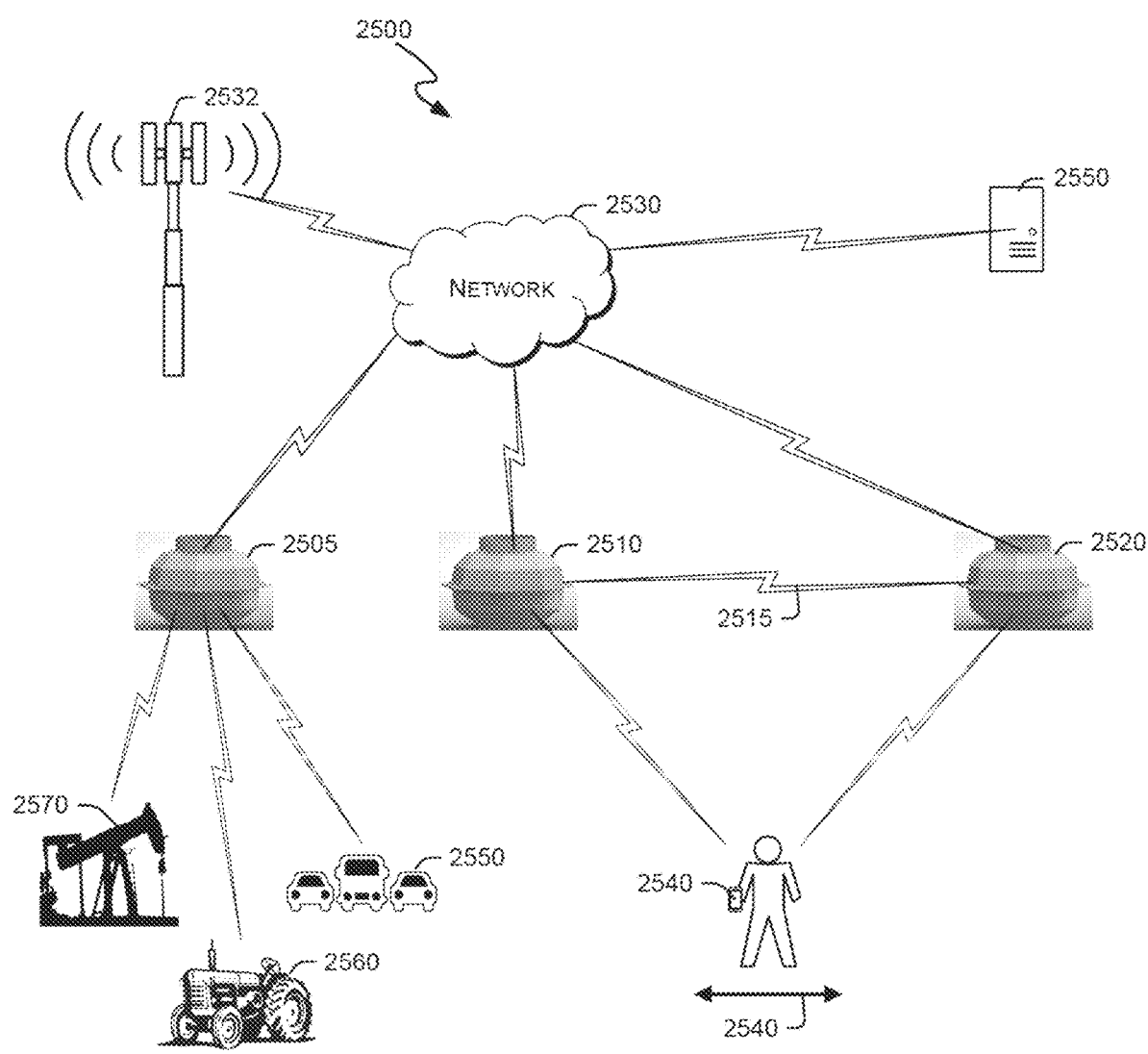
FIG. 25 illustrates a system view of an embodiment of a scalable communications system of the present disclosure.

FIG. 25 depicts one embodiment of a system implementation of the present invention. Scalable communications modules 2505, 2510, and 2520 are communicatively coupled to a network 2530, which provides connectivity between communications modules 2505, 2510, and 2520, a remote server 2550, and an external telecommunications system such as a cellular or satellite-based telephony system 2532. In certain embodiments, the network 2530 may further include the Internet or any other data interchange network. Additionally, in certain embodiments communications modules 2510, 2520 may be communicatively coupled 2515, such as through a wireless link, so that (a) data may be shared between the devices, (b) local networks (peer to peer or client server-based may be created; (c) resource allocation can be managed directly between communications modules 2510, 2520; and for any other desired purpose. Further, the remote server 2550 may be configured to provide many functions, such as software provisioning and updates, operational system monitoring, interfaces to external networks such as the Internet, system modeling and control, data processing, prediction and local event monitoring, system development, revenue generation and tracking, and any other purpose. Although one server 2550 is illustrated, a plurality of servers may be utilized in concert with the illustrated embodiment.

A user with a mobile device 2540 may be communicatively coupled, such as through a Wi-Fi, Bluetooth, or cellular connection to one or more of the communications modules 2510, 2520. As the user moves within the system, 2540, embodiments of the present invention provide for a handover of connections between communications modules 2510, 2520 to support a stronger wireless link to the mobile device 2540 as the device's RF signal environment changes from the movement. In certain embodiments, the mobile device 2540 may maintain a plurality of connections to multiple communications modules to better establish a redundant data path, or to provide for additional bandwidth by wireless allocation across multiple communications modules. It is also appreciated that mobile device 2540 may maintain a communications link with a cellular telephony system 2532 through its own dedicated communications link, or may establish a communications link to a cellular system via connection through one or more communications modules 2510, 2520. Connections provided by the communications modules between the mobile device 2540 and external cellular system may be advantageous, for example, in environments where an outside cellular signal may be degraded or impaired (such as in a large building or near the extreme range of a cellular antenna), or may be advantageous when used in line-of-sight implementations of millimeter-wave 5G cellular implementations, where geographically close communications modules may reduce interference with high speed data connections.

Various other applications and uses may accommodated by aspects of the present invention. For example a communications module 2505 may be communicatively coupled to an oil field apparatus 2570; an agricultural apparatus 2560; manually driven or autonomous vehicles 2550; and smart parking meter management systems, stadium provision systems, municipal management systems, weather tracking, and various other applications (not shown).

Those of skill in the relevant arts appreciate that various combinations of components and configurations described herein comprise additional embodiments of the claimed invention. Examples of additional inventive combinations include the following:

1. A system comprising:
   a first communications module, the communications module comprising:
   a modular processor comprising a central controller in electrical communication with a plurality of interchangeable modules;

a first interchangeable module of the plurality of interchangeable modules configured as a first radio module in electrical communication with at least one of a plurality of antenna elements disposed within a plurality of layers, whereby the antenna elements within a layer of the plurality of layers are configured to operate within one assigned frequency band; and a second interchangeable module of the plurality of interchangeable modules configured as a network module to communicatively couple the central controller with an external network; and wherein the modular processor is configured to provide wireless data connectivity between the external network and a mobile device in wireless communication with at least one of a plurality of antenna elements.

2. The system of claim 1, wherein the first radio module is in electrical communication with a plurality of antenna elements disposed within one layer of the plurality of layers.

3. The system of claim 1 or 2, wherein the plurality of interchangeable modules further comprises a second interchangeable module configured as a second radio module in electrical communication with a second antenna of the plurality of antenna elements disposed within the plurality of layers.

4. The system of claim 1 or 2 or 3, wherein the first radio module is in electrical communication with a first antenna element disposed within a first layer of the plurality of layers, and a second antenna element disposed within a second layer of the plurality of layers.

5. The system of claim 1 or 2, further comprising a second radio module, wherein the first radio module is in electrical communication with a first antenna element disposed within a first layer of the plurality of layers, and the second radio module is in electrical communication with a second antenna element disposed within a second layer of the plurality of layers.

6. The system of claim 1, wherein: the modular processor further comprises an intermediary board comprising a bus, a bus connector for electrical and mechanical coupling to the plurality of interchangeable modules; and at least one of an intermediary board and a first module of the plurality of interchangeable modules further comprises:
a central processing unit electrically coupled to the bus;
a memory electrically coupled to the processing unit; and
a storage electrically coupled to the processing unit.

7. The system of claim 1 or 6, wherein the plurality of interchangeable modules perform distributed processing of tasks allocated by the modular processor.

8. The system of claim 1 or 6 or 7, wherein the modular processor is configured to monitor security access in real time.

9. The system of claim 1 or 6 or 7 or 8, wherein the modular processor is configured to:
receive a message from a remote server coupled to the network module; and
transmit the message for push processing to an application running on a mobile devices wirelessly coupled to the modular processor.

10. The system of claim 1 or 6, wherein the modular processor is further configured to measure an RF parameter of an environment in proximity to the communications module and optimize allocations of frequencies to achieve a predetermined optimal communications threshold.

11. The system of claim 1 or 6 or 10, wherein the RF parameter is selected from a group consisting of: RF noise; electromagnetic interference; frequencies detected from external transmitters; RF reflections; available RF bandwidth; wireless coverage; available data rates; network capacity; RF roaming capability; Quality of Service (QoS); and combinations thereof.

12. The system of claim 1 or 6, wherein the modular processor is configured to provide a function selected from the group consisting of:
detecting occurrence of a gunshot within a defined area;
receiving an order from a patron of an entertainment venue;
providing an automated interface to an agricultural operation;
automating an oil well operation;
optimizing flow of vehicles within a defined traffic monitoring area by:
detecting a level of traffic within the defined area indicating an area of traffic congestion;
determining an optimal route by analyzing nearby light traffic sequences in proximity to the area of traffic congestion;
providing instructions to coordinate traffic light sequences and divert vehicular traffic according to the determination;
monitoring an environmental condition regarding a chemical substance, further including:
detecting and monitoring chemical seepage level;
detecting and monitoring $CO_2$ a emissions level; and
detecting and monitoring a gas level;
monitoring a condition regarding a material in regard to structural health of a mechanical structure, whereby the condition may include an indicia of metal fatigue, vibration, deformation, cracking, displacement, or combinations thereof;
use of artificial intelligence algorithms in controlling access to and monitoring one of: restricted areas, closed-circuit television areas (CCTVs), and alarm systems;
measuring, in regards to water, a pressure, a level, a flow rate, a chemical content, and combinations thereof;
detecting a condition indicative of a detect dangerous pattern in a land condition, including the monitoring one or more of: a soil moisture content, a soil vibration rate, a soil displacement, a seismograph output, a soil stress indicia, and an earth density measurement;
optimizing power consumption of a building by automating one or more of a building heating system, a building energy usage system, a building lighting system, and a building ventilation system;
operating a smart parking system within a metropolitan area;
monitoring movement of animals with a tracking device within a defined area;
and combinations thereof.

13. The system of claim 1 or 6, wherein the modular processor is configured to
monitor bandwidth allocations based on a use parameter criterion;
predict an improved allocation scheme based on the monitored allocations; and
re-allocate bandwidth between one or more antenna elements of the plurality of antenna elements.

14. The system of claim 1 or 6 or 13, wherein the use parameter criterion is selected from the group consisting of data use by time of day, data use by frequency, mobile device handover conflict; data use as a function of available bandwidth; power consumption by the communications module; event scheduling; and a predicted change in mobile device users entering RF range of the communications module.

15. The system of claim 1, wherein the modular processor comprises an interface for electrical communication with an interchangeable module selected from the group consisting of a radio module, a small cell module, a security module, a data analytics module, a point-to-point/multipoint module, a storage module, a power management module, a solar power module, a heat management module, a camera interface module, an environmental sensor interface module, an RFID tracking module, an environmental lighting module, and a VPN module.

16. The system of claim 1 or 2 or 6, wherein the interchangeable modules may be interchanged while the modular processor is electrically energized and in operational mode.

17. The system of claim 1 or 2 or 6, wherein the modular processor reconfigures a resource allocation based upon a change in configuration of interchangeable modules that were altered while the controller is in operation.

18. The system of claim 1 or 2 or 6, wherein the modular processor reconfigures a resource allocation based upon a change in configuration of interchangeable modules that were altered while the controller was in one of a quiescent state or a powered-down state.

19. The system of claim 1 or 6 or 17 or 18, wherein the modular controller allocates a resource based upon at least one of:
    a request received from an application of a mobile device wirelessly coupled to the communications module; and
    a remote server coupled to the network module.

20. The system of claim 1, wherein the interchangeable modules are electrically coupled to the controller through one or more of a PCI Express (PCIe, PCI PCI-e or PCI-X) connection, an Industry Standard Architecture (ISA) connection, an Extended Industry Standard Architecture (EISA) connection, a Micro Channel Architecture (MCA) connection, a Video Electronics Standards Association (VESA) connection, a Peripheral Component Interconnect (PCI) connection, a Personal Computer Memory Card Industry Association (PCMCIA or "PC" bus) connection, an Accelerated Graphics Port (AGP) connection, a Small Computer Systems Interface (SCSI) connection, a Versa Module European (VME) connection, a Firewire (IEEE 1394) connection, and a Lightning bus protocol.

21. The system of claim 1 or 6, further comprising:
    establishing a plurality of communications links to a mobile device through a first communications link associated with a first antenna element of the plurality of antenna elements and a second communications link associated with a second antenna element of the plurality of antenna elements; and
    controlling, by the modular processor, an allocation of bandwidth between the first communications link and the second communications link.

22. The system of claim 1 or 6, further including a second communication module with a second processor, cooperatively operating with the first communication module to manage handover to a mobile device within range of the first and second communication modules.

23. The system of claim 1 or 6 or 22, wherein the handover is one of a break-before-make or make-before-break handover.

24. The system of claim 1 or 6, wherein a mobile device wirelessly coupled to a first antenna element of the plurality of antenna elements is further wirelessly coupled to a second antenna element of the plurality of antenna elements.

25. The system of claim 1 or 6 or 22 or 24 wherein a handover of communications between the first antenna element and the second antenna element occurs in reaction to detecting, by the modular processor, that the mobile device is entering a serviced frequency band of the second antenna element.

26. The system of claim 1, further comprising a small cellular network antenna in electrical communications with a cellular radio module electrically coupled to the modular processor.

27. The system of claim 1, wherein the modular processor is configured to provide data connectivity with a plurality of mobile devices wirelessly coupled to the communications module, and wherein the plurality of mobile devices operate within respectively different frequency bands.

28. The system of claim 1 or 27, wherein the modular processor is further configured to allocate a bandwidth criterion between at least two of the frequency bands.

29. The system of claim 1 or 27, wherein the modular processor is further configured to alter a transmitted power from one or more radio modules of the plurality of radio modules.

30. The system of claim 1, wherein the assigned frequency band is selected from a group consisting of a Wi-Fi band, a 2.4 GHz band; a 3.5 GHz band, a 5 GHz band; a controlled-power custom radio band, and an AMPS, GSM, 3G, 4G, 5G or LTE cellular telephony band.

31. The system of claim 1, wherein:
    the first communications module is further coupled to an installation terminal; and
    the first communications module provides, through an interface within the installation terminal, one of: status information; antenna tuning information; power-on-self-test information; diagnostic information; instructions regarding antenna pointing to achieve a desired RF performance; and identification and configuration information.

32. The system of claim 1, wherein the modular processor is configured to monitor data transmissions between a mobile device wirelessly connected to the communications module and augment a marketing processing database with information related to the mobile device.

33. The system of claim 1, wherein the first radio module further comprises a software defined radio, and is further configured to service a predetermined frequency band and modulation.

34. The system of claim 1 or 22, wherein the communications module is wirelessly coupled to a second communications module, and the modular processor is configured to:
    determine a resource allocation between the communications modules;
    transmit configuration data to the second communication module; and
    reconfigure a bandwidth allocation according to the determination.

35. The system of claim 1 or 22, wherein:
    the communications module is communicatively coupled to a remote server through the network; and
    the modular processor is further configured to receive resource allocation information from the remote server.

36. The system of claim 1, wherein a fourth module of the plurality of modules coupled to the modular processor is configured to provide an intrusion detection function.

37. The system of claim 36, wherein the fourth module is configured with an input node and an output node, and wherein the fourth module may be further configured to provide a pass-through function so that one of the input node and output node allows data traffic to be input and the other node of the input and output nodes allows data traffic to be output.

38. The system of claim 1, wherein a fourth module of the plurality of modules coupled to the modular processor is configured to provide an intrusion protection function.

39. The system of claim 1, wherein a fourth module of the plurality of modules coupled to the modular processor is configured to provide an encrypted Virtual Private Network (VPN) connection to a mobile device in wireless communication with the modular processor.

40. The system of claim 1, wherein a fourth module of the plurality of modules coupled to the modular processor is configured to:
monitor data accessed by the communications module;
collect information determined relevant to a data mining schema; and
transmit the collected information to the remote server.

41. The system of claim 1 or 6 or 22, wherein the modular processor is configured with a plurality of interchangeable modules to monitor one or more of a soil composition; crop health; animal location; animal health; watering and/or irrigation moisture; oil well pressure; oil well flow; stadium human movement and traffic; security conditions using human facial recognition; pollution emissions; vehicular traffic flow; a weather condition in proximity to the communications module; a safety-related condition; financial transaction processing; a street lighting condition; smart parking meter operations; a crime event; a fire event; and combinations thereof.

42. The system of claim 1 or 22, wherein a module of the plurality of interchangeable modules is configured to operate in one or more mobile walkie-talkie radio bands, police radio bands, citizen radio bands, emergency radio bands, aircraft communication bands, and combinations thereof.

43. The system of claim 1 or 22 or 42, wherein the communications module is further configured to provide a walkie-talkie repeater function.

44. The system of claim 1 or 22 or 42, wherein the communications module is further configured to provide a walkie-talkie emulator function, whereby a press to talk function is provided to applications executed by mobile devices that are communicatively coupled to the communications module.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A system comprising:
a first communications module, the communications module comprising:
a modular processor comprising a central controller in electrical communication with a plurality of interchangeable modules;
a first interchangeable module of the plurality of interchangeable modules configured as a first radio module in electrical communication with at least one of a plurality of antenna elements disposed within a plurality of layers, whereby the antenna elements within a layer of the plurality of layers are configured to operate within one assigned frequency band; and
a second interchangeable module of the plurality of interchangeable modules configured as a network module to communicatively couple the central controller with an external network; and
wherein the modular processor is configured to provide wireless data connectivity between the external network and a mobile device in wireless communication with at least one of a plurality of antenna elements,
wherein the modular processor is further configured to:
monitor bandwidth allocations based on a use parameter criterion,
predict an improved allocation scheme based on the monitored allocations, and
re-allocate bandwidth between one or more antenna elements of the plurality of antenna elements of the first communications module,
wherein the use parameter criterion includes power consumption by the communications module, and
wherein the modular processor is further configured to measure an RF parameter of an environment in proximity to the communications module and optimize allocations of frequencies to achieve a predetermined optimal communications threshold.

2. The system of claim 1, wherein the first radio module is in electrical communication with a plurality of antenna elements disposed within one layer of the plurality of layers.

3. The system of claim 1, wherein the plurality of interchangeable modules further comprises a second interchangeable module configured as a second radio module in electrical communication with a second antenna of the plurality of antenna elements disposed within the plurality of layers.

4. The system of claim 1, wherein the first radio module is in electrical communication with a first antenna element disposed within a first layer of the plurality of layers, and a second antenna element disposed within a second layer of the plurality of layers.

5. The system of claim 1, further comprising a second radio module, wherein the first radio module is in electrical communication with a first antenna element disposed within a first layer of the plurality of layers, and the second radio module is in electrical communication with a second antenna element disposed within a second layer of the plurality of layers.

6. The system of claim 1, wherein: the modular processor further comprises an intermediary board comprising a bus, a bus connector for electrical and mechanical coupling to the plurality of interchangeable modules; and
  at least one of an intermediary board and a first module of the plurality of interchangeable modules further comprises:
    a central processing unit electrically coupled to the bus;
    a memory electrically coupled to the processing unit; and
    a storage electrically coupled to the processing unit.

7. The system of claim 6, wherein the plurality of interchangeable modules perform distributed processing of tasks allocated by the modular processor.

8. The system of claim 1, wherein the RF parameter is selected from a group consisting of: RF noise; electromagnetic interference; frequencies detected from external transmitters; RF reflections; available RF bandwidth; wireless coverage; available data rates; network capacity; RF roaming capability; Quality of Service (QoS); and combinations thereof.

9. The system of claim 1, wherein the interchangeable modules are electrically coupled to the controller through one or more of a PCI Express (PCIe, PCI PCI-e or PCI-X) connection, an Industry Standard Architecture (ISA) connection, an Extended Industry Standard Architecture (EISA) connection, a Micro Channel Architecture (MCA) connection, a Video Electronics Standards Association (VESA) connection, a Peripheral Component Interconnect (PCI) connection, a Personal Computer Memory Card Industry Association (PCMCIA or "PC" bus) connection, an Accelerated Graphics Port (AGP) connection, a Small Computer Systems Interface (SCSI) connection, a Versa Module European (VME) connection, a Firewire (IEEE 1394) connection, and a Lightning bus protocol.

10. The system of claim 1, further comprising:
  establishing a plurality of communications links to a mobile device through a first communications link associated with a first antenna element of the plurality of antenna elements and a second communications link associated with a second antenna element of the plurality of antenna elements; and
  controlling, by the modular processor, an allocation of bandwidth between the first communications link and the second communications link.

11. The system of claim 1, wherein a mobile device wirelessly coupled to a first antenna element of the plurality of antenna elements is further wirelessly coupled to a second antenna element of the plurality of antenna elements.

12. The system of claim 1, further comprising a small cellular network antenna in electrical communications with a cellular radio module electrically coupled to the modular processor.

13. The system of claim 1, wherein the modular processor is configured to provide data connectivity with a plurality of mobile devices wirelessly coupled to the communications module, and wherein the plurality of mobile devices operate within respectively different frequency bands.

14. The system of claim 1, wherein the modular processor is further configured to allocate a bandwidth criterion between at least two of the frequency bands.

15. The system of claim 1, wherein the assigned frequency band is selected from a group consisting of a Wi-Fi band, a 2.4 GHz band; a 3.5 GHz band, a 5 GHz band; a controlled-power custom radio band, and an AMPS, GSM, 3G, 4G, 5G or LTE cellular telephony band.

16. The system of claim 1, wherein:
  the first communications module is further coupled to an installation terminal; and
  the first communications module provides, through an interface within the installation terminal, one of: status information; antenna tuning information; power-on-self-test information; diagnostic information; instructions regarding antenna pointing to achieve a desired RF performance; and identification and configuration information.

17. The system of claim 1, wherein the first radio module further comprises a software defined radio, and is further configured to service a predetermined frequency band and modulation.

18. A system comprising:
  a first communications module, the communications module comprising:
    a modular processor comprising a central controller in electrical communication with a plurality of interchangeable modules;
    a first interchangeable module of the plurality of interchangeable modules configured as a first radio module in electrical communication with at least one of a plurality of antenna elements disposed within a plurality of layers, whereby the antenna elements within a layer of the plurality of layers are configured to operate within one assigned frequency band; and
    a second interchangeable module of the plurality of interchangeable modules configured as a network module to communicatively couple the central controller with an external network; and
  wherein the modular processor is configured to provide wireless data connectivity between the external network and a mobile device in wireless communication with at least one of a plurality of antenna elements,
  wherein the modular processor is further configured to:
    monitor bandwidth allocations based on a use parameter criterion,
    predict an improved allocation scheme based on the monitored allocations, and
    re-allocate bandwidth between one or more antenna elements of the plurality of antenna elements of the first communications module, and
  wherein the use parameter criterion includes power consumption by the communications module,
  wherein the first communications module is wirelessly coupled to a second communications module, and the modular processor is configured to:
    determine a resource allocation between the communications modules;
    transmit configuration data to the second communication module; and
    reconfigure a bandwidth allocation according to the determination.

* * * * *